US012730360B2

(12) United States Patent
Lee et al.

(10) Patent No.: US 12,730,360 B2

(45) Date of Patent: Sep. 8, 2026

(54) CAMERA ACTUATOR AND CAMERA MODULE INCLUDING SAME

(71) Applicant: LG INNOTEK CO., LTD., Seoul (KR)

(72) Inventors: Jun Taek Lee, Seoul (KR); Chan Joong Kim, Seoul (KR); Jeong Gi You, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 36 days.

(21) Appl. No.: 18/995,467

(22) PCT Filed: Jul. 27, 2023

(86) PCT No.: PCT/KR2023/010938

§ 371 (c)(1),
(2) Date: Jan. 16, 2025

(87) PCT Pub. No.: WO2024/025363

PCT Pub. Date: Feb. 1, 2024

(65) Prior Publication Data

US 2026/0044051 A1 Feb. 12, 2026

(30) Foreign Application Priority Data

Jul. 29, 2022 (KR) ........................ 10-2022-0094808
Jul. 24, 2023 (KR) ........................ 10-2023-0096016

(51) Int. Cl.
*G03B 13/36* (2021.01)
*G03B 3/10* (2021.01)
(Continued)

(52) U.S. Cl.
CPC ............... *G03B 13/36* (2013.01); *G03B 3/10* (2013.01); *G03B 5/00* (2013.01); *G03B 30/00* (2021.01);
(Continued)

(58) Field of Classification Search
CPC ........ H04N 23/00; H04N 23/52; H04N 23/54; H04N 23/55; H04N 23/57; G03B 3/10;
(Continued)

(56) References Cited

U.S. PATENT DOCUMENTS

2020/0177815 A1 6/2020 Kim et al.
2020/0348479 A1* 11/2020 Kwon .................... G02B 7/021
2024/0319471 A1* 9/2024 Kwon .................... G02B 7/021

FOREIGN PATENT DOCUMENTS

KR 10-2006-0025448 A 3/2006
KR 10-2015-0097661 A 8/2015
(Continued)

*Primary Examiner* — Lin Ye
*Assistant Examiner* — Chriss S Yoder, III
(74) *Attorney, Agent, or Firm* — Birch, Stewart, Kolasch & Birch, LLP

(57) ABSTRACT

Disclosed in an embodiment of the present invention is a camera actuator including: a housing including a first side portion and a second side portion facing each other; a first lens assembly and a second lens assembly which move in the optical axis direction within the housing; and a driving unit which moves the first lens assembly and the second lens assembly, wherein the driving unit includes a first coil including a first sub-coil and a second sub-coil sequentially arranged in the optical axis direction, and the first side portion includes a first groove in which the first coil is disposed and a first reinforcing member disposed between the first sub-coil and the second sub-coil.

15 Claims, 20 Drawing Sheets

(51) Int. Cl.

| | |
|---|---|
| ***G03B 5/00*** | (2021.01) |
| ***G03B 30/00*** | (2021.01) |
| ***H02K 11/215*** | (2016.01) |
| ***H04N 23/00*** | (2023.01) |
| ***H04N 23/52*** | (2023.01) |
| ***H04N 23/54*** | (2023.01) |
| ***H04N 23/55*** | (2023.01) |
| ***H04N 23/57*** | (2023.01) |

(52) U.S. Cl.
CPC ........... *H02K 11/215* (2016.01); *H04N 23/00* (2023.01); *H04N 23/52* (2023.01); *H04N 23/54* (2023.01); *H04N 23/55* (2023.01); *H04N 23/57* (2023.01); *G03B 2205/0069* (2013.01); *G03B 2217/002* (2013.01)

(58) Field of Classification Search
CPC .......... G03B 5/00; G03B 13/36; G03B 30/00; G03B 2205/0069; G03B 2217/002; H02K 11/215; H02K 41/035
See application file for complete search history.

(56) References Cited

FOREIGN PATENT DOCUMENTS

| | | |
|---|---|---|
| KR | 10-1853047 B1 | 4/2018 |
| KR | 10-2407367 B1 | 6/2022 |

* cited by examiner

[FIG. 1]
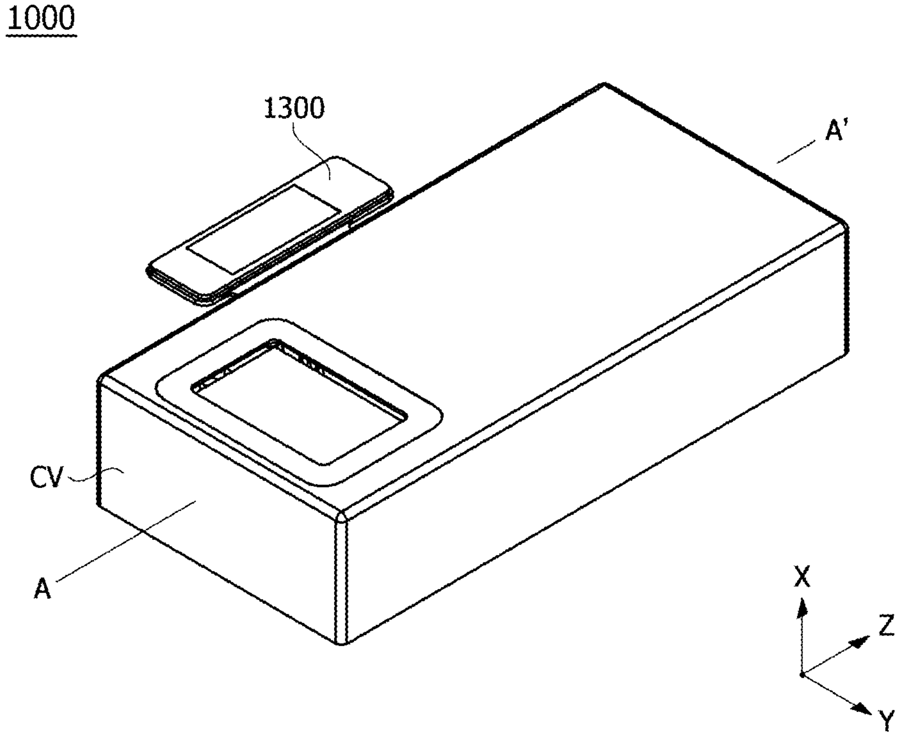

[FIG. 2]
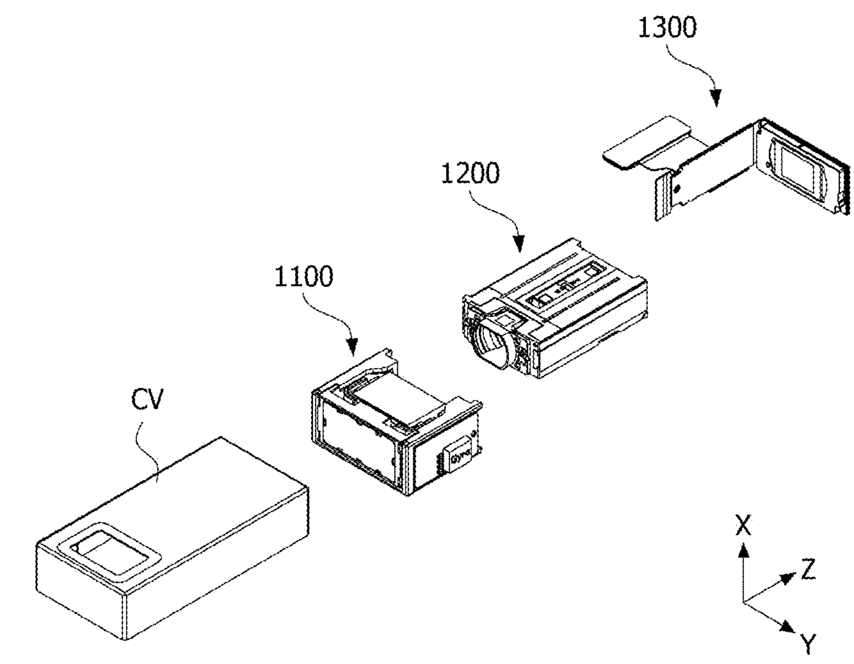
[FIG. 3]
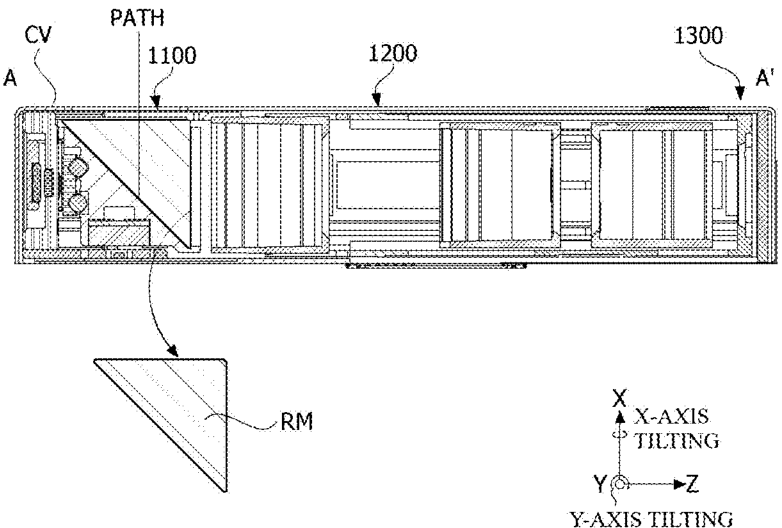

[FIG. 4]
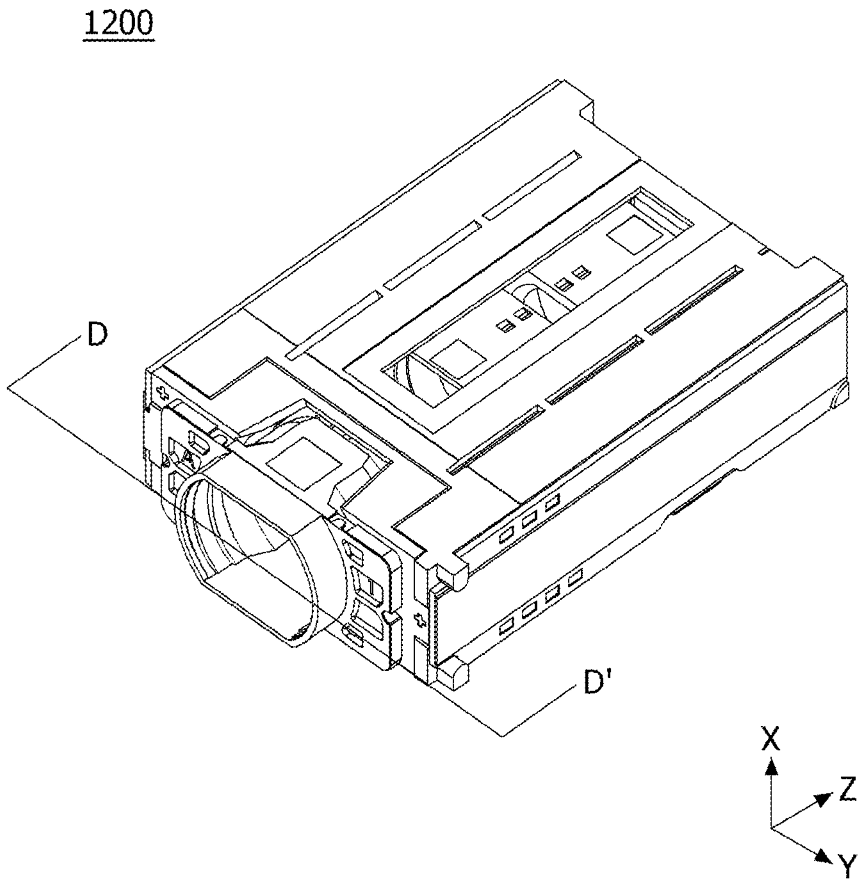

[FIG. 5]
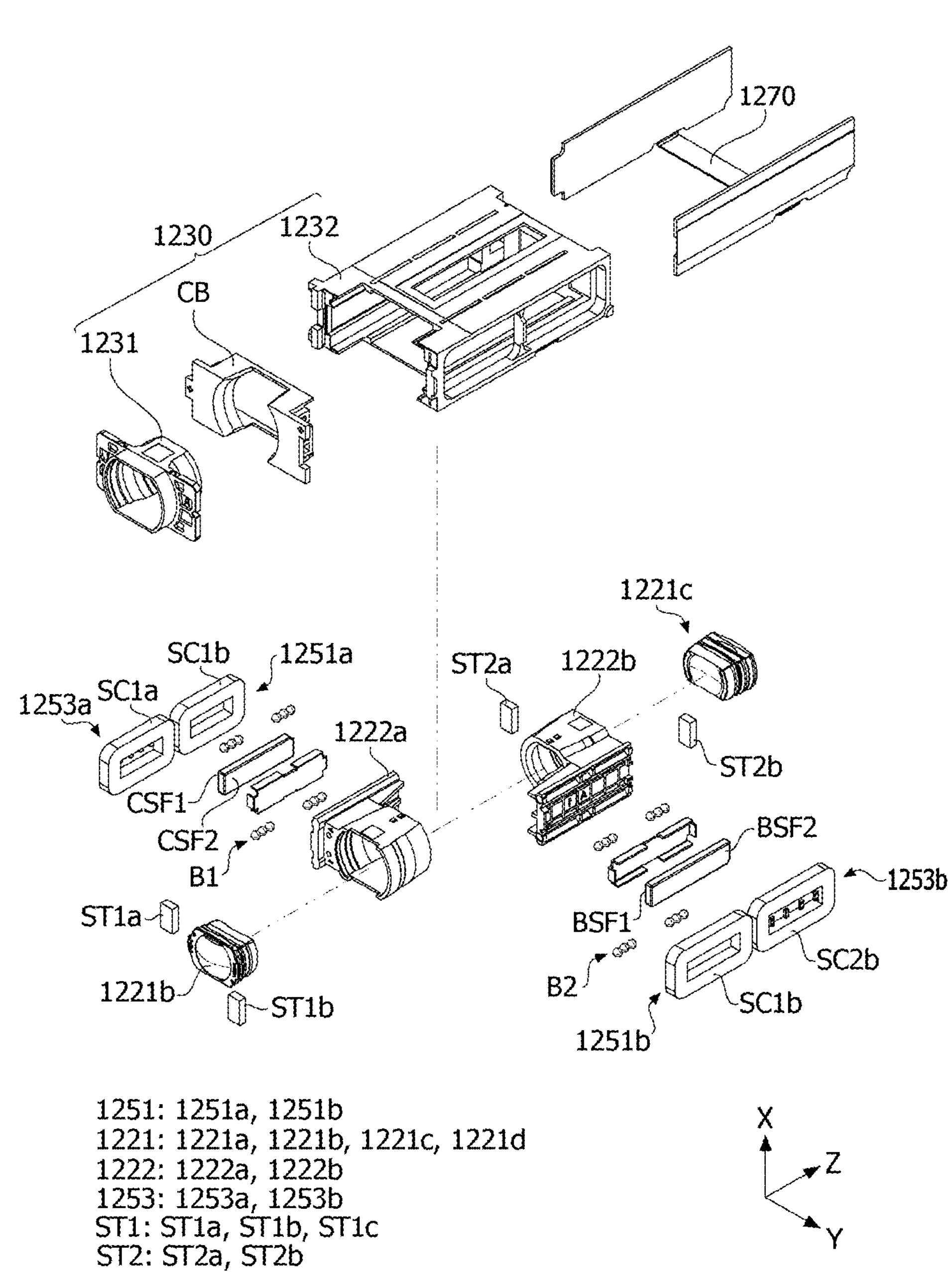

[FIG. 6]
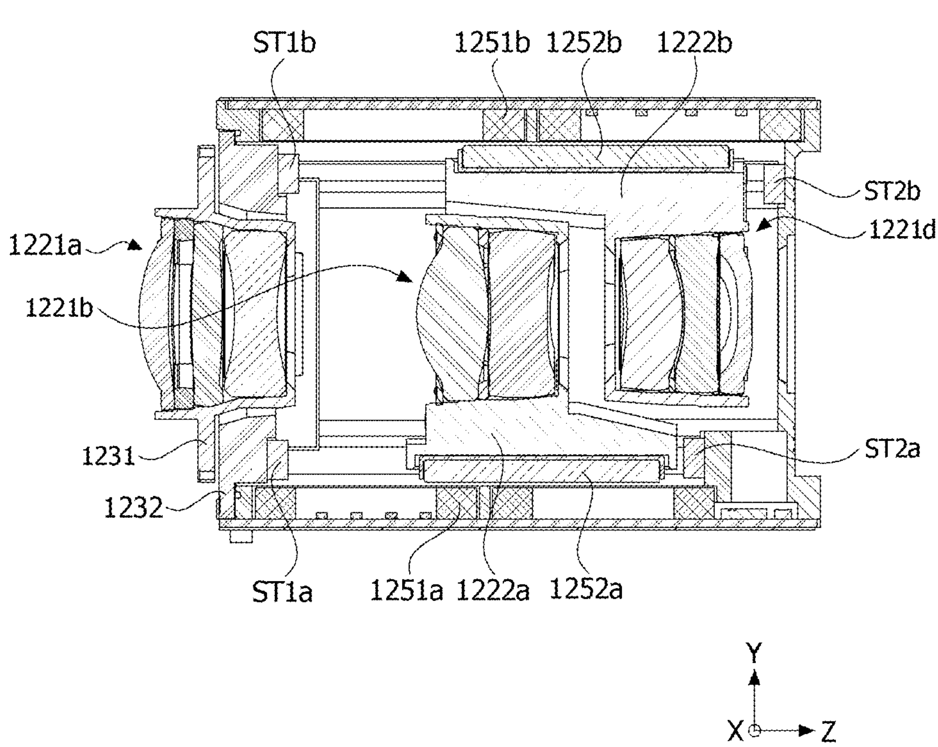

[FIG. 7]
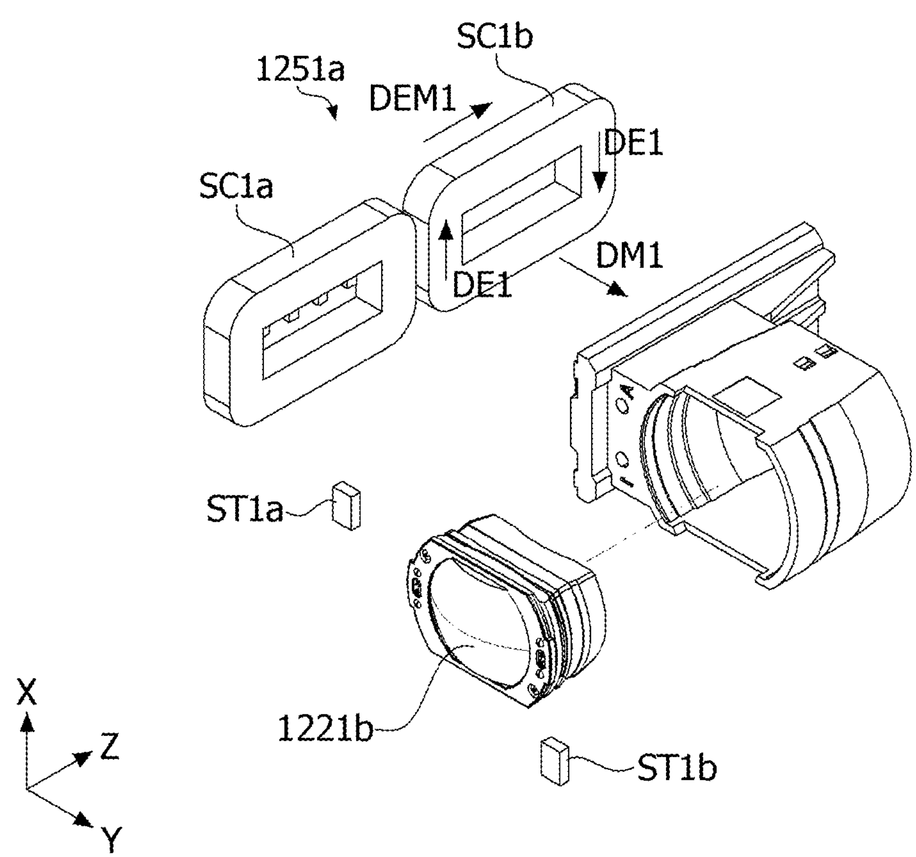

[FIG. 8]
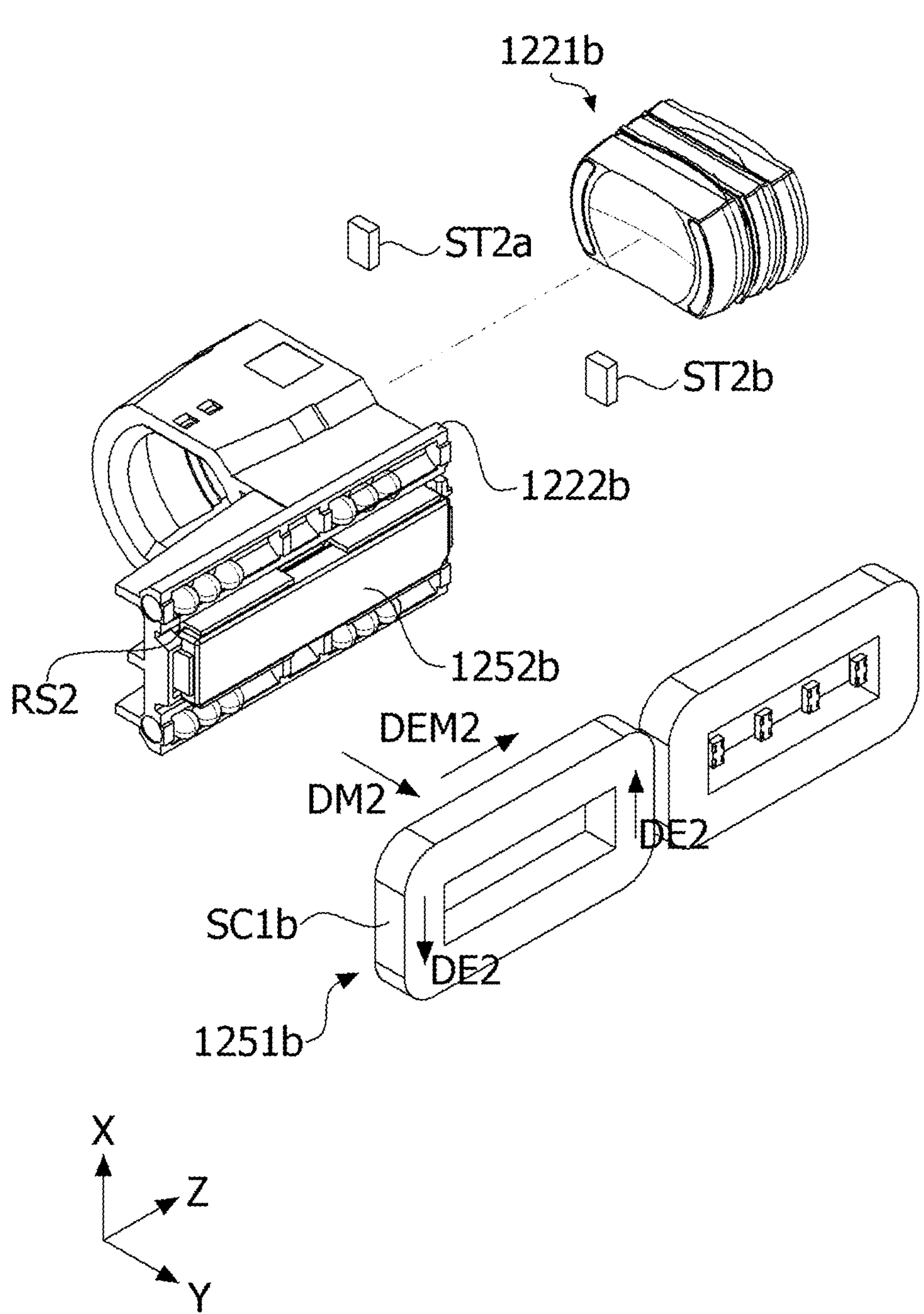

[FIG. 9]
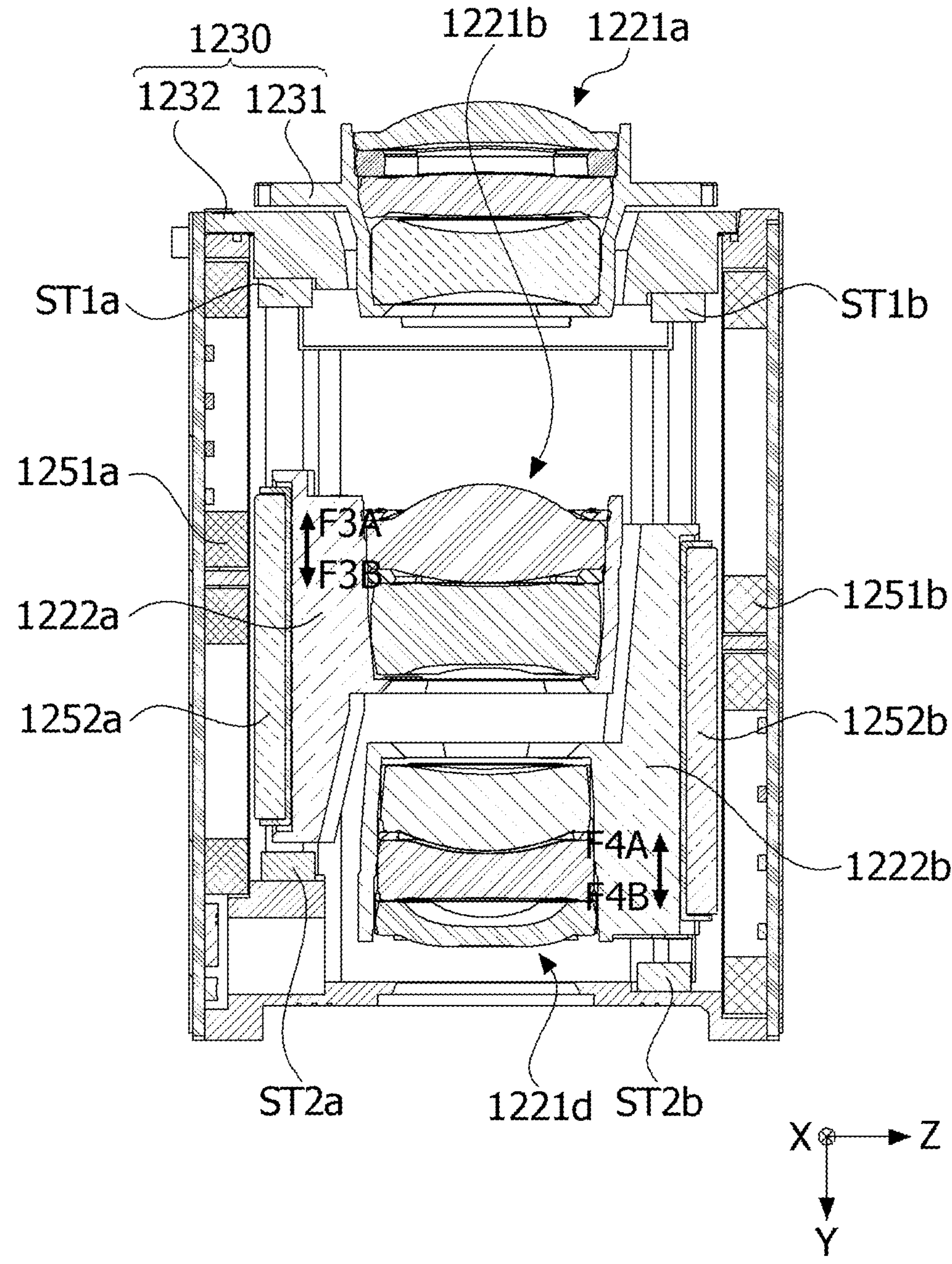

[FIG. 10]
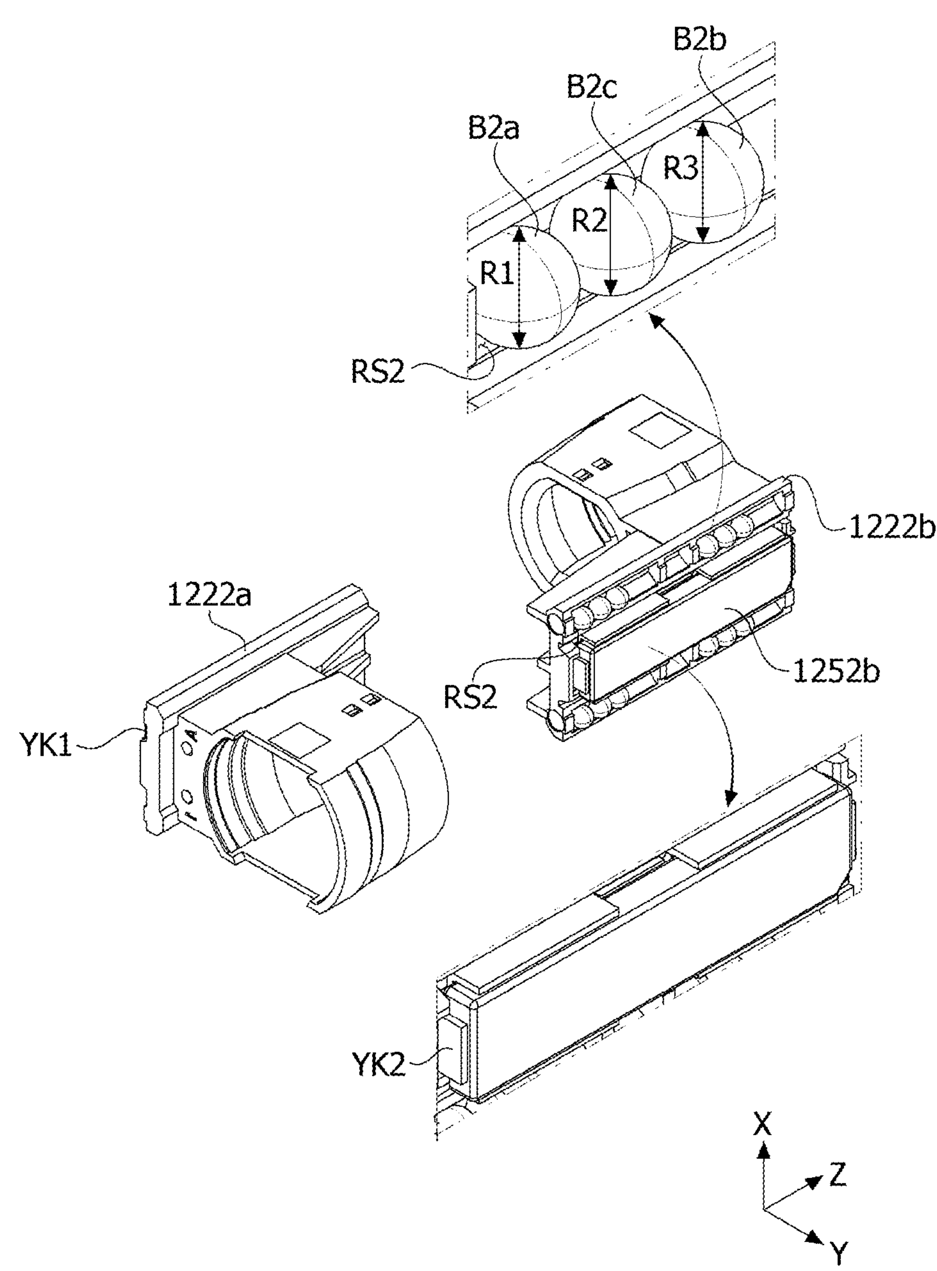

[FIG. 11]
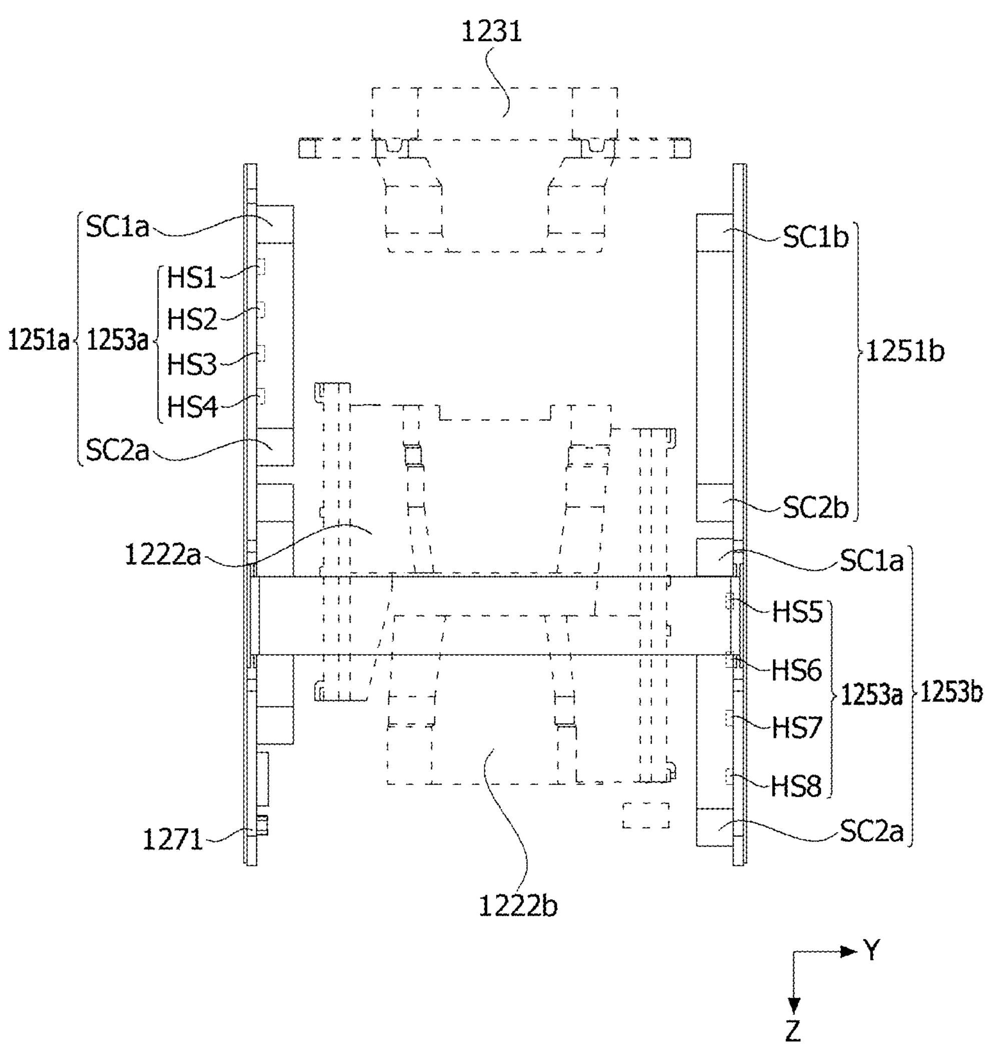

[FIG. 12]
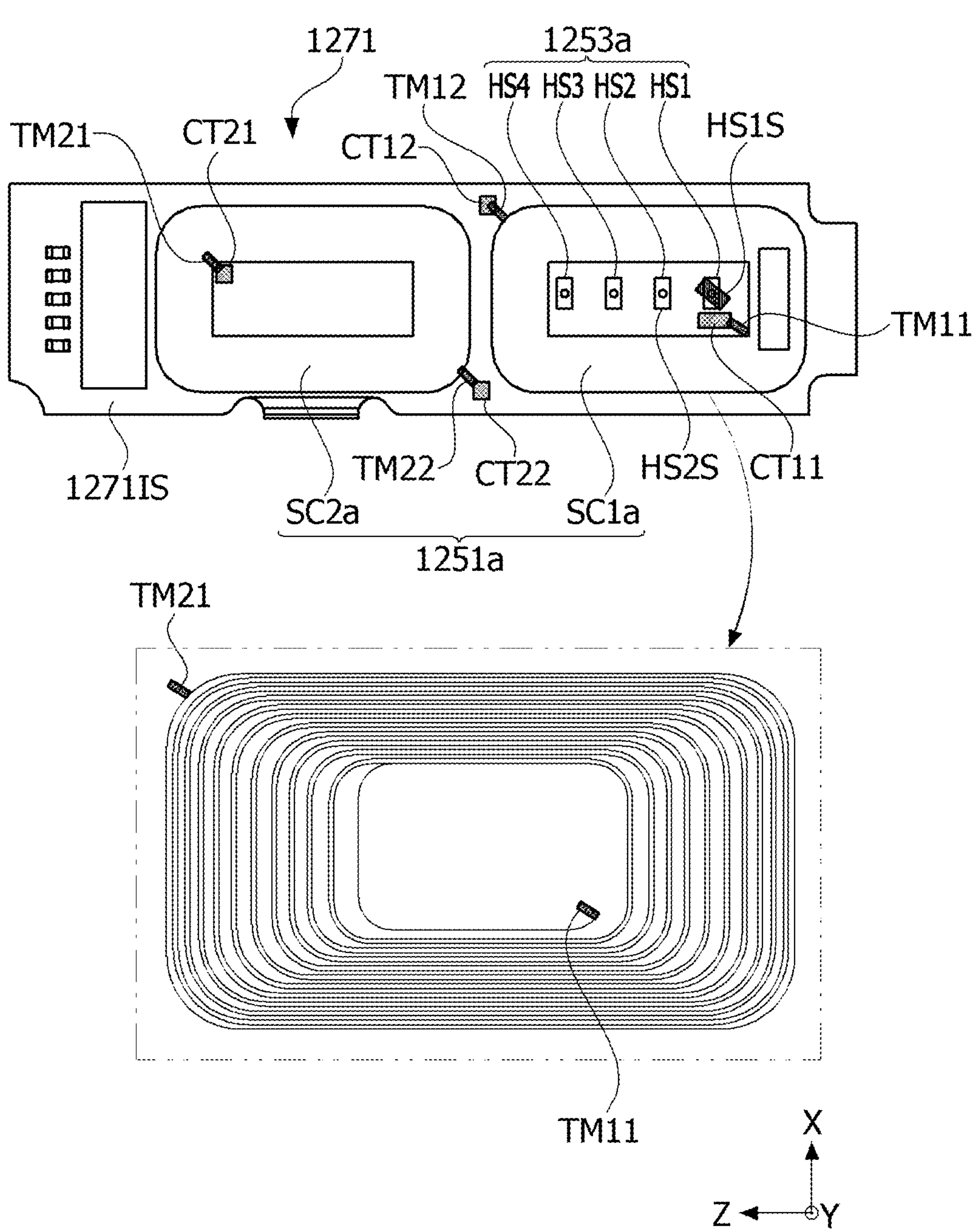

[FIG. 13]
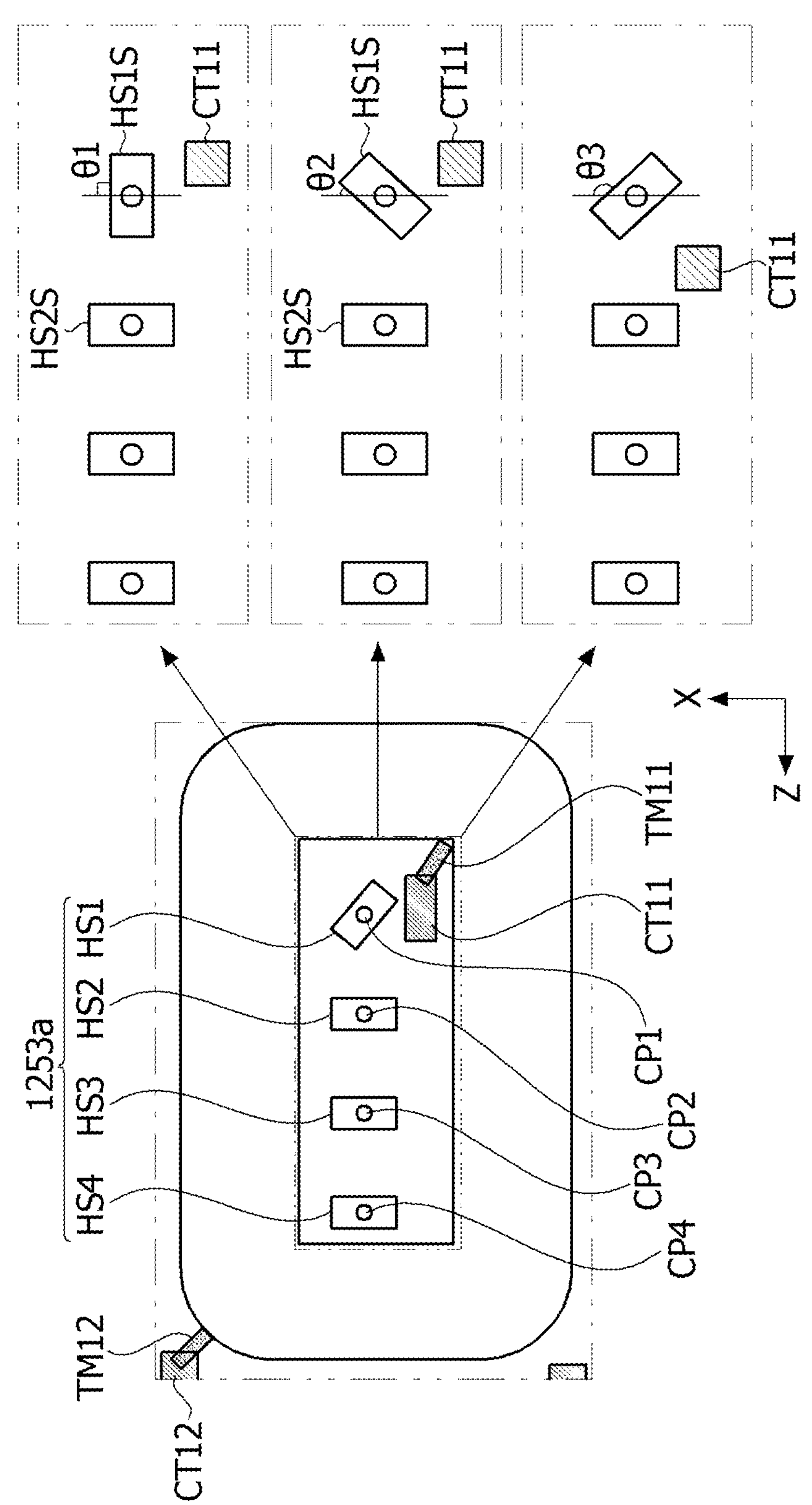

[FIG. 14]
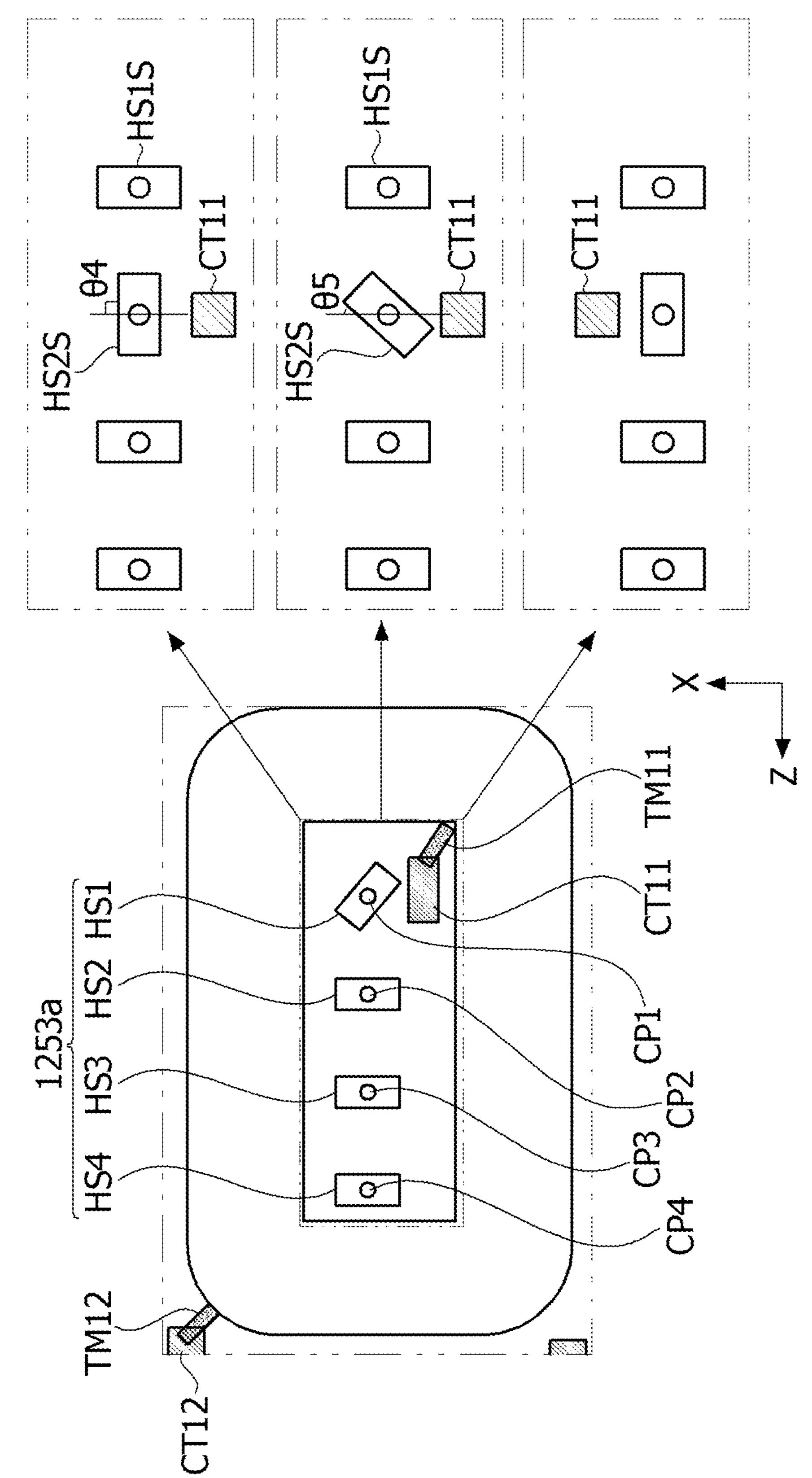

[FIG. 15]
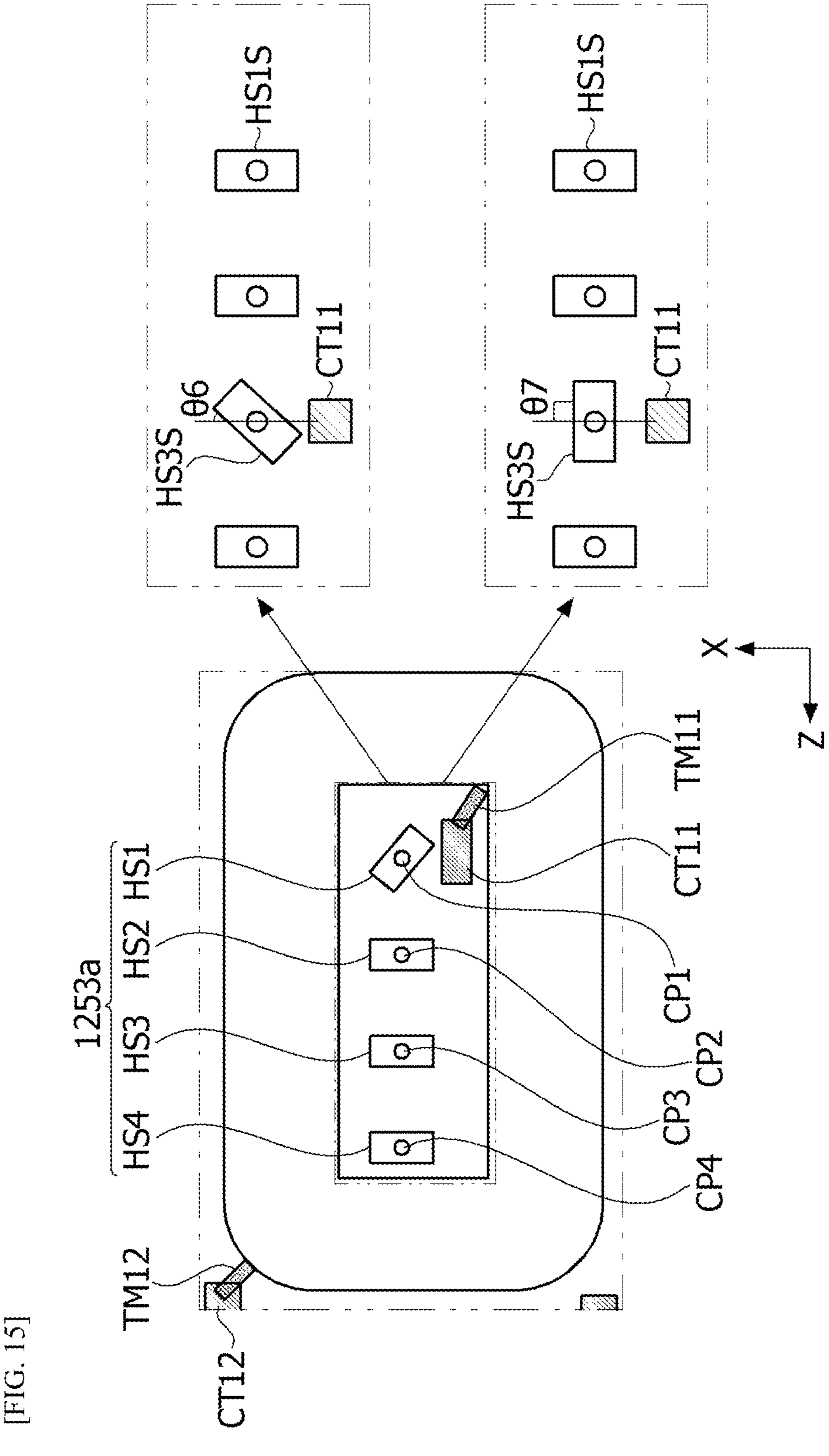

[FIG. 16]
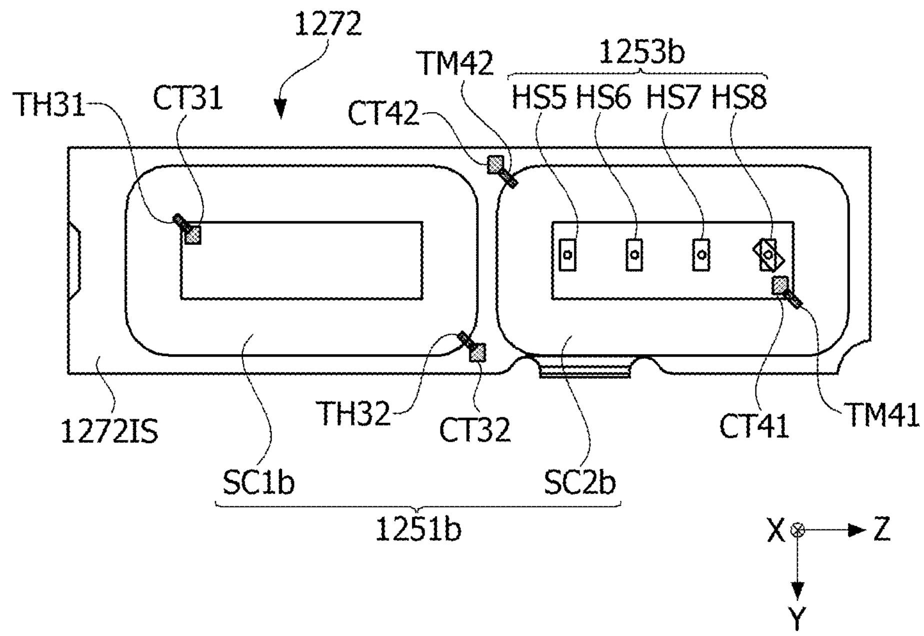
[FIG. 17]
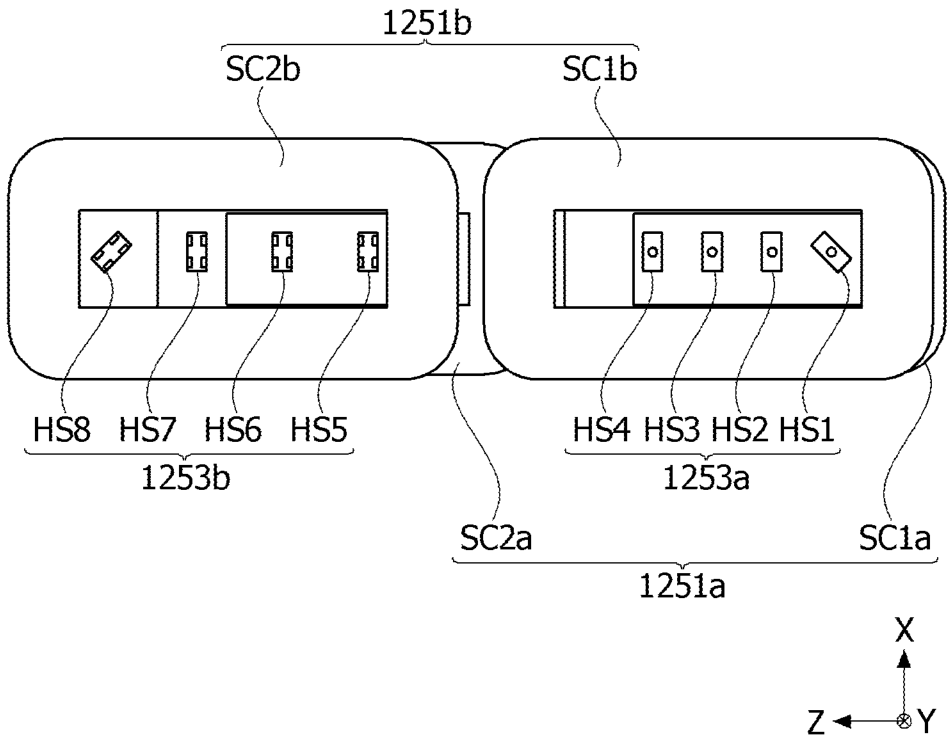

[FIG. 18]
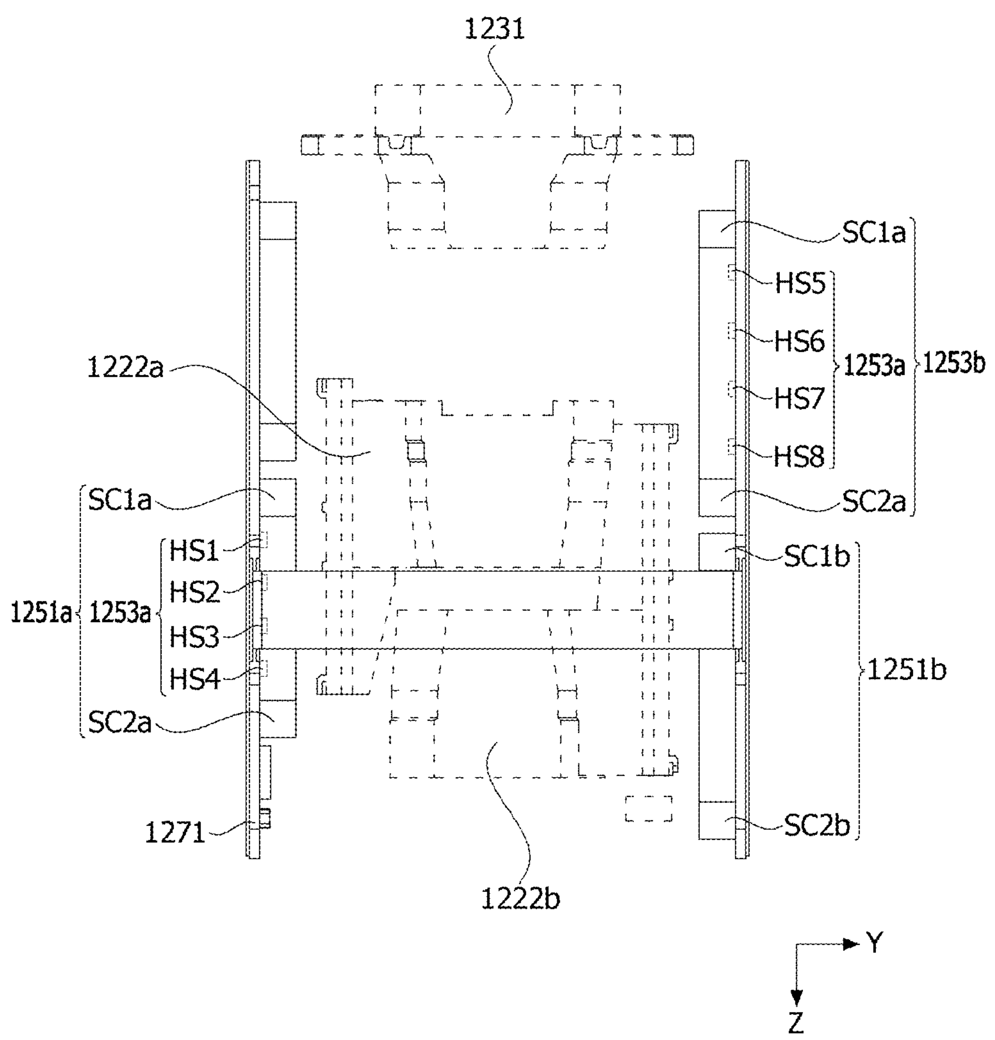

[FIG. 19]
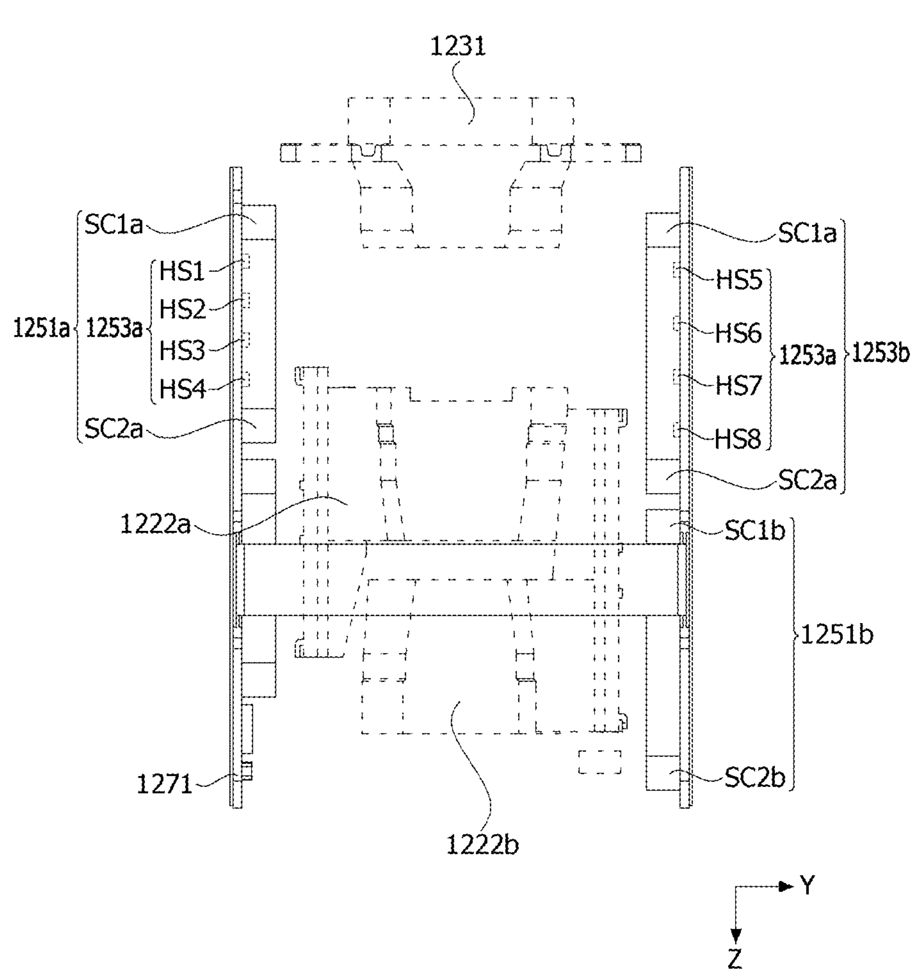

[FIG. 20]
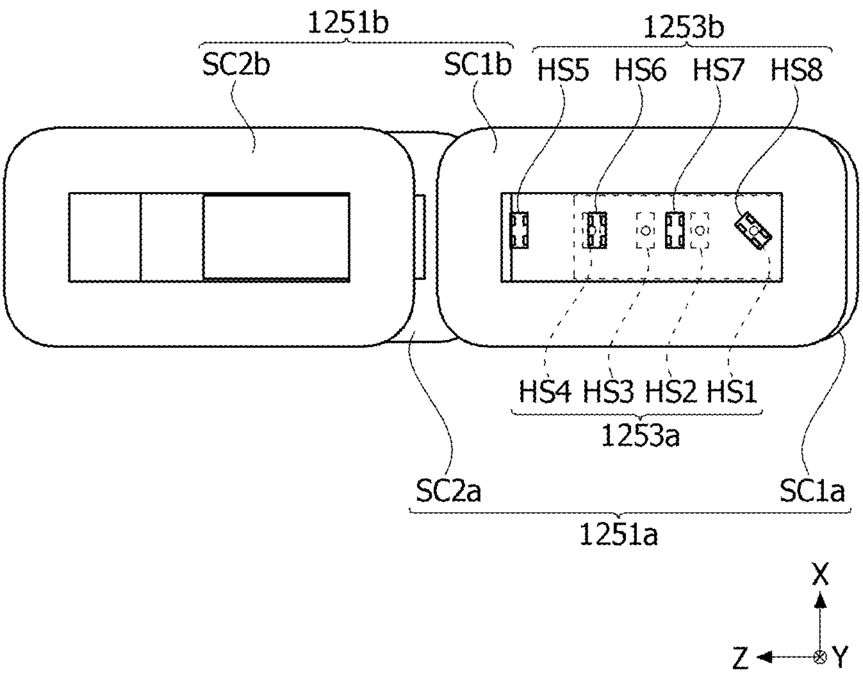

[FIG. 21]
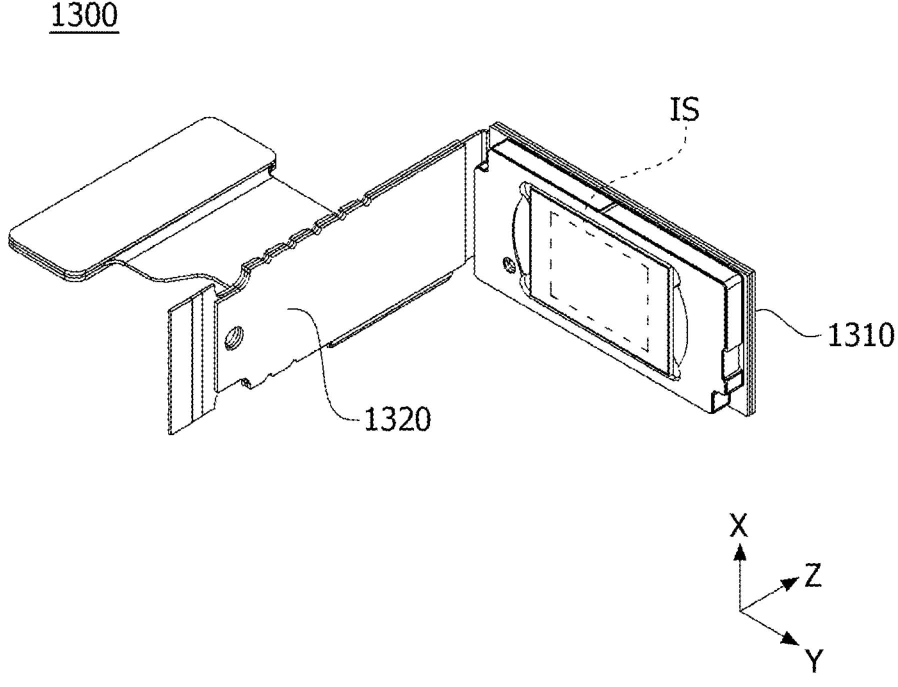
[FIG. 22]
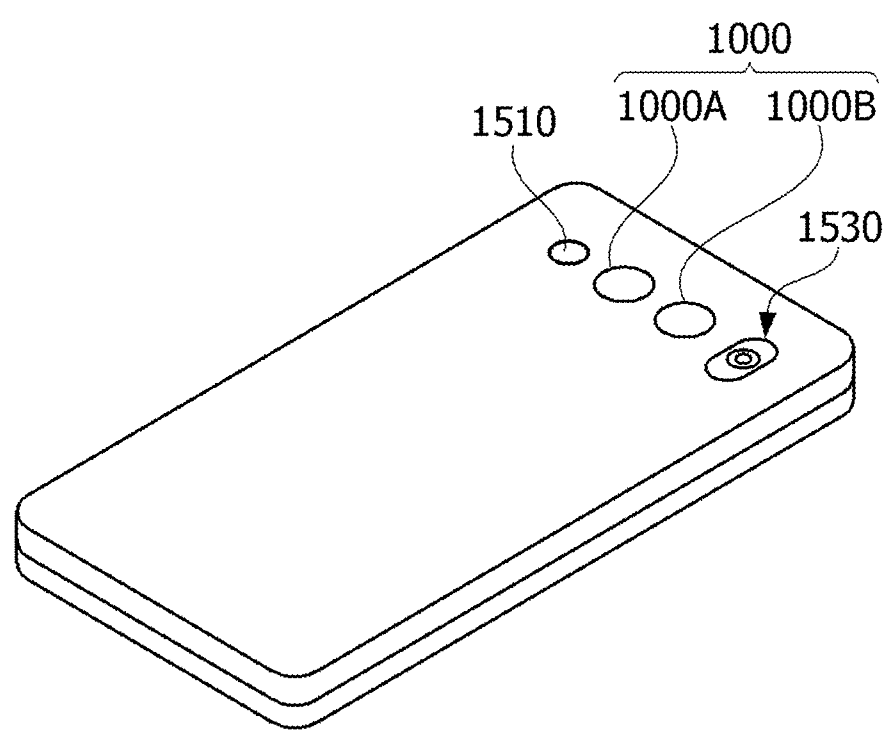

[FIG. 23]
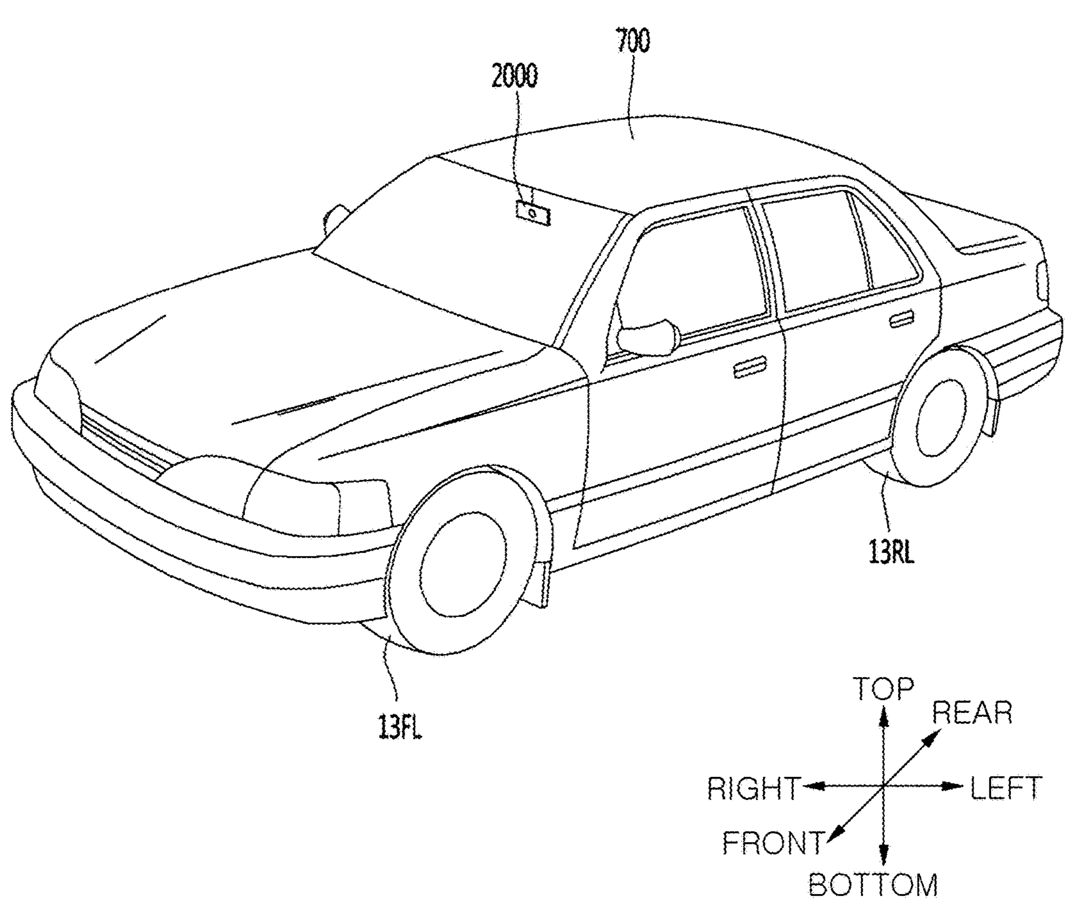

CAMERA ACTUATOR AND CAMERA MODULE INCLUDING SAME

CROSS REFERENCE TO RELATED APPLICATIONS

This application is the National Phase of PCT/KR2023/010938 filed on Jul. 27, 2023 which claims priority under 35 U.S.C. § 119(a) to Patent Application No. 10-2022-0094808 filed in the Republic of Korea on Jul. 29, 2022, and Patent Application No. 10-2023-0096016 filed in the Republic of Korea on Jul. 24, 2023, all of which are hereby expressly incorporated by reference into the present application.

TECHNICAL FIELD

The present invention relates to a camera actuator and a camera module including the same.

BACKGROUND ART

A camera is a device for taking pictures or videos by capturing images of subjects and is mounted on mobile devices, drones, vehicles, or the like. To improve the quality of the image, a camera module may have an image stabilizer (IS) function for correcting or preventing the image shake caused by the movement of a user, an auto focusing (AF) function for aligning a focal length of a lens by automatically adjusting an interval between an image sensor and the lens, and a zooming function for capturing a remote subject by increasing or decreasing the magnification of the remote subject through a zoom lens.

However, there is a problem that manufacturing is difficult due to the miniaturization of the camera module.

DISCLOSURE

Technical Problem

Embodiments of the present invention are directed to providing a camera actuator and a camera module, which have improved reliability through the arrangement of a sub-Hall sensor.

In addition, the embodiments of the present invention are directed to providing a camera actuator and a camera module, which maintain driving accuracy through positions between a sub-Hall sensor and a sub-coil and secure a space for electrical connection.

In addition, the embodiments of the present invention are directed to providing a camera actuator and a camera module, which provide different driving distances and increased driving efficiency through different lengths between sub-coils.

The embodiments of the present invention are directed to providing a camera actuator applicable to ultra-slim, ultra-small, and high-resolution cameras.

The objects of embodiments are not limited thereto and may also include objects or effects that may be identified from the configurations or embodiments to be described below.

Technical Solution

A camera actuator according to an embodiment of the present invention includes a housing, a first lens assembly and a second lens assembly that move in an optical axis direction in the housing, and a driving part that moves the first lens assembly and the second lens assembly, wherein the driving part includes a first coil including a first sub-coil and a second sub-coil that are sequentially disposed in the optical axis direction, and a first Hall sensor including a plurality of sub-Hall sensors disposed in one of the first sub-coil and the second sub-coil, and a long side of at least one of the plurality of sub-Hall sensors is disposed to be misaligned with those of other Hall sensors.

The first Hall sensor may be disposed inside at least one of the first sub-coil and the second sub-coil.

The first sub-coil may include a first terminal extending an inside of a hole of the first sub-coil and a second terminal extending to an outside of the first sub-coil.

The camera actuator may further include a board part disposed outside the driving part, wherein the first coil may be disposed on the board part, and the board part may include a first connection point in contact with the first terminal and a second connection point in contact with the second terminal.

At least one of the plurality of sub-Hall sensors may be adjacent to the first connection point.

At least one of the plurality of sub-Hall sensors may overlap the first connection point in a direction perpendicular to the optical axis direction.

Other Hall sensors among the plurality of sub-Hall sensors may be disposed to be misaligned with the first connection point in the direction perpendicular to the optical axis direction.

The plurality of sub-Hall sensors may include a first sub-Hall sensor, a second sub-Hall sensor, a third sub-Hall sensor, and a fourth sub-Hall sensor that are sequentially disposed in the optical axis direction.

The first connection point may overlap the first sub-Hall sensor in a direction perpendicular to the optical axis direction.

The first connection point may be disposed between the first sub-Hall sensor and the second sub-Hall sensor.

A long side of the first sub-Hall sensor may not be parallel to long sides of the second sub-Hall sensor, the third sub-Hall sensor, and the fourth sub-Hall sensor.

The first connection point may overlap the second sub-Hall sensor in a direction perpendicular to the optical axis direction.

The first sub-Hall sensor, the second sub-Hall, the third sub-Hall, and the fourth sub-Hall sensor may have the same separation distance between adjacent sub-Hall sensors and centers of the first to fourth sub-Hall sensors.

The first coil may be connected to an inner surface of the board part, and the plurality of sub-Hall sensors may be disposed on the inner surface of the board part.

The first Hall sensor may have a separation distance from the first sub-coil in the optical axis direction that is smaller than a separation distance from the coil in a direction perpendicular to the optical axis direction.

Advantageous Effects

According to the embodiments of the present invention, it is possible to implement the camera actuator and the camera module, which have improved reliability through the arrangement of the sub-Hall sensor.

In addition, according to the embodiments of the present invention, it is possible to implement the camera actuator and the camera module, which maintain driving accuracy through the positions between the sub-Hall sensor and the sub-coil and secure the space for electrical connection.

In addition, according to the embodiments of the present invention, it is possible to implement the camera actuator and the camera module, which provide different driving distances and increased driving efficiency through different lengths between the sub-coils.

According to the embodiments of the present invention, it is possible to provide the camera actuator applicable to ultra-slim, ultra-small, and high-resolution cameras.

Various and beneficial advantages and effects of the present invention are not limited to the above-described contents and will be more readily understood in a process of describing specific embodiments of the present invention.

DESCRIPTION OF DRAWINGS

FIG. 1 is a perspective view of a camera module according to an embodiment.

FIG. 2 is an exploded perspective view of the camera module according to the embodiment.

FIG. 3 is a view along line AA' in FIG. 1.

FIG. 4 is a perspective view of a second camera actuator according to an embodiment.

FIG. 5 is an exploded perspective view of the second camera actuator according to the embodiment.

FIG. 6 is a cross-sectional view along line DD' in FIG. 4.

FIGS. 7 and 8 are views for describing each driving of a lens assembly according to an embodiment.

FIG. 9 is a view for describing driving of the second camera actuator according to the embodiment.

FIG. 10 is a perspective view of some components of the second camera actuator according to the embodiment.

FIG. 11 is a view for describing parts of a 2-1 housing, a first lens assembly, a second lens assembly, and a driving part in the second camera actuator according to the embodiment.

FIG. 12 is a view for describing a part of a first driving part and a first board in the second camera actuator according to the embodiment.

FIGS. 13 to 15 are views illustrating various usage examples of FIG. 12.

FIG. 16 is a view illustrating a part of a second driving part and a second board in the second camera actuator according to the embodiment.

FIG. 17 is a side view illustrating a part of the driving part in the second camera actuator according to the embodiment.

FIG. 18 is a view for describing parts of a 2-1 housing, a first lens assembly, a second lens assembly, and a driving part in a second camera actuator according to another embodiment.

FIG. 19 is a view for describing parts of a 2-1 housing, a first lens assembly, a second lens assembly, and a driving part in the second camera actuator according to still another embodiment.

FIG. 20 is a side view illustrating a part of the driving part in FIG. 19.

FIG. 21 is a schematic diagram illustrating a circuit board according to an embodiment.

FIG. 22 is a perspective view of a mobile terminal to which the camera module according to the embodiment is applied.

FIG. 23 is a perspective view of a vehicle to which the camera module according to the embodiment is applied.

MODE FOR INVENTION

Since the present invention may have various changes and various embodiments, specific embodiments are illustrated and described in the accompanying drawings. However, it should be understood that it is not intended to limit specific embodiments, and it should be understood to include all modifications, equivalents, and substitutes included in the spirit and scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a first component is described as being "connected" or "coupled" to a second component, it should be understood that the first component may be directly connected or coupled to the second component or a third component may be present therebetween. On the other hand, when a certain component is described as being "directly connected" or "directly coupled" to another component, it should be understood that others components are not present therebetween.

The terms used in the present application are only used to describe specific embodiments and are not intended to limit the present invention. The singular includes the plural unless the context clearly dictates otherwise. In the application, it should be understood that terms "include" and "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are denoted by the same reference numeral regardless of the reference numerals, and overlapping descriptions thereof will be omitted.

FIG. 1 is a perspective view of a camera module according to an embodiment, FIG. 2 is an exploded perspective view of the camera module according to the embodiment, and FIG. 3 is a view along line AA' in FIG. 1.

Referring to FIGS. 1 and 2, a camera module 1000 according to the embodiment may include a cover CV, a first camera actuator 1100, a second camera actuator 1200, and a circuit board 1300. Here, the first camera actuator 1100 may be used interchangeably with "first actuator," and the second camera actuator 1200 may be used interchangeably with "second actuator."

The cover CV may cover the first camera actuator 1100 and the second camera actuator 1200. It is possible to increase coupling strength between the first camera actuator 1100 and the second camera actuator 1200 by the cover CV.

Furthermore, the cover CV may be made of a material that blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator. For example, the first camera actuator 1100 may move an optical member in a direction perpendicular to the optical axis (axis of incident light).

The first camera actuator 1100 may include a fixed focal length lens disposed in a predetermined barrel (not illustrated). The fixed focal length lens may be referred to as "single focal length lens" or "single lens."

The first camera actuator 1100 may change an optical path. In an embodiment, the first camera actuator 1100 may vertically change the optical path through an internal optical member (e.g., a prism or a mirror). For example, the optical member may change light from a first direction (X-axis direction) to a third direction (Z-axis direction). Alternatively, the optical member may change the light from a first axis to a second axis. With this configuration, even when a thickness of a mobile terminal is decreased, a lens with a focal length that is greater than the thickness of the mobile terminal is disposed in the mobile terminal through a change in the optical path so that magnification and auto focusing (AF), zooming, and OIS functions may be performed.

However, the present invention is not limited thereto, and the first camera actuator 1100 may change the optical path vertically or at a predetermined angle multiple times.

The second camera actuator 1200 may be disposed at a rear end of the first camera actuator 1100. The second camera actuator 1200 may be coupled to the first camera actuator 1100. In addition, mutual coupling may be performed in any method.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a control unit.

In addition, one lens or a plurality of lens may independently or separately move in the optical axis direction.

The circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided.

A camera module according to the embodiment may be formed of one camera module or a plurality of camera modules. For example, the plurality of camera modules may include a first camera module and a second camera module.

In addition, the first camera module may include one actuator or a plurality of actuators. For example, the first camera module may include the first camera actuator 1100 and the second camera actuator 1200.

In addition, the second camera module may include an actuator (not illustrated) disposed in a predetermined housing (not illustrated) and capable of driving a lens part. The actuator may be a voice coil motor, a micro actuator, a silicon actuator, and the like and applied in any method such as an electrostatic method, a thermal method, a bimorph method, and an electrostatic force method, but the present invention is not limited thereto. In addition, in the present specification, the camera actuator may be referred to as "actuator" or the like. In addition, the camera module formed of the plurality of camera modules may be mounted in any electronic device such as a mobile terminal. Furthermore, the actuator may be a device for moving or tilting the lens or the optical member. However, hereinafter, the actuator will be described as including the lens or the optical member. Furthermore, the actuator may be referred to as "lens transfer device," "lens moving device," "optical member transfer device," "optical member moving device," etc.

Referring to FIG. 3, the camera module according to the embodiment may include the first camera actuator 1100 for performing the OIS function and the second camera actuator 1200 for performing the zooming function and the AF function.

Light may be incident on the camera module or the first camera actuator through an opening region positioned in an upper surface of the first camera actuator 1100. That is, the light may primarily enter the first camera actuator 1100 in a vertical direction (e.g., an X-axis direction, based on incident light), and the optical path may be changed in an optical axis direction (e.g., a Z-axis direction) through the optical member. In addition, the light may pass through the second camera actuator 1200 and may be incident on an image sensor IS positioned at one end of the second camera actuator 1200 (PATH). In the present specification, the Z-axis direction or a third direction will be described as the optical axis direction as follows. In addition, the first direction and the X-axis direction will be described as the vertical direction. In addition, a second direction and a Y-axis direction will be described as a horizontal direction.

In the present specification, a lower surface indicates one side in a first direction. In addition, the first direction is the X-axis direction in the drawings and may be used interchangeably with a second axis direction or the like. A second direction is a Y-axis direction in the drawings and may be used interchangeably with a first axis direction or the like. The second direction is a direction perpendicular to the first direction. In addition, the third direction is the Z-axis direction in the drawings and may be used interchangeably with a third axis direction or the like. In addition, the third direction is perpendicular to both the first direction and the second direction. Here, the third direction (Z-axis direction) corresponds to the optical axis direction, and the first direction (X-axis direction) and the second direction (Y-axis direction) are directions perpendicular to the optical axis. In addition, hereinafter, the optical axis direction is the third direction (Z-axis direction) in the description of the first and second camera actuators, and based on this, the following description will be given.

In addition, in the present specification, an inside may be a direction from the cover CV to the first camera actuator, and an outside may be a direction opposite to the inside. That is, the first camera actuator and the second camera actuator may be positioned inside the cover CV, and the cover CV may be positioned outside the first camera actuator or the second camera actuator.

In addition, with this configuration, the camera module according to the embodiment may resolve the spatial limitations of the first camera actuator and the second camera actuator by changing the optical path. That is, the camera module according to the embodiment may extend the optical path while minimizing the thickness of the camera module in response to the change in the optical path. Furthermore, it should be understood that the second camera actuator may provide a high range of magnification by controlling a focus or the like in the extended optical path.

In addition, the camera module according to the embodiment can implement OIS by controlling the optical path through the first camera actuator, thereby minimizing the occurrence of a decentering or tilting phenomenon and providing the best optical characteristics.

Furthermore, the second camera actuator 1200 may include an optical system and a lens driving part. For example, at least one of a first lens assembly, a second lens assembly, and a third lens assembly may be disposed in the second camera actuator 1200.

In addition, the second camera actuator 1200 may include a coil and a magnet and perform a high-magnification zooming function and the AF function.

For example, although the first lens assembly and the second lens assembly may be moving lenses that move through the coil, the magnet, and a guide pin and the third lens assembly may be a fixed lens, the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below. In addition, the first lens assembly to the third lens assembly may move in the optical axis direction, that is, in the third direction. In addition, the first lens assembly to the third lens assembly may move in the third direction independently or dependently. In the present invention, the first lens assembly and the second lens assembly may move in the optical axis direction. In addition, the third lens assembly may be positioned at a front end of the first lens assembly or at a rear end of the second lens assembly. In addition, the third lens assembly may not move in the optical axis direction. That is, the third lens assembly may be a fixed part. In addition, the first and second lens assemblies may be moving parts.

Meanwhile, when the OIS actuator and the AF/zoom actuator are disposed according to the embodiment of the present invention, the magnetic field interference with AF/zoom magnets can be prevented when OIS is driven. Since a first driving magnet of the first camera actuator 1100 is disposed separately from the second camera actuator 1200, it is possible to prevent the magnetic field interference between the first camera actuator 1100 and the second camera actuator 1200. In the present specification, OIS may be used interchangeably with terms such as hand shaking correction, optical image stabilization, optical image correction, or shaking correction.

In particular, an optical member RM in the first camera actuator 1100 may tilt along an X-axis or a Y-axis. Accordingly, the optical path can be easily changed according to the X-axis tilting or the Y-axis tilting.

The optical member RM may be seated on a holder of the first camera actuator or the like. In an embodiment, the optical member RM may be formed of a mirror or a prism. Hereinafter, the optical member RM is illustrated as being the prism, but may be formed of a plurality of lenses as in the above-described embodiment. Alternatively, the optical member RM may be formed of the plurality of lenses and the prism or the mirror. In addition, the optical member RM may include a reflector disposed therein. However, the present invention is not limited thereto.

The optical member RM in the first camera actuator 1100 may tilt along an X-axis or a Y-axis by the driving of a VCM or the like. That is, OIS may be implemented by tilting or rotating the optical member RM in the Y-axis direction or the X-axis direction.

FIG. 4 is a perspective view illustrating a second camera actuator according to the embodiment, FIG. 5 is an exploded perspective view illustrating the second camera actuator according to the embodiment, FIG. 6 is a cross-sectional view of the second camera actuator along line DD' in FIG. 4, FIGS. 7 and 8 are views for describing each driving operation of a lens assembly according to the embodiment, and FIG. 9 is a view for describing driving of the second camera actuator according to the embodiment.

Referring to FIGS. 4 to 6, the second camera actuator 1200 (or a camera device, a zoom lens transport device, a zoom lens moving device, or a lens transport device) according to the embodiment may include a lens part 1220, a housing 1230, a driving part 1250, a base part 1260, a board part 1270, and stoppers ST1 and ST2. Furthermore, the second camera actuator 1200 may further include a shield can (not illustrated), an elastic part (not illustrated), and a bonding member (not illustrated).

In addition, as will be described below, a lens group may move in the optical axis direction. In addition, the lens group may be coupled with a lens assembly to move together in the optical axis direction. In this case, the second camera actuator may include a moving part that moves in the optical axis direction like the lens group, and a fixed part relatively fixed without moving in the optical axis direction unlike the moving part. In the present embodiment, the moving part may include lens assemblies (e.g., first and second lens assemblies), optical driving magnets (first and second driving magnets). In addition, the fixed part may include a housing, a board part, optical driving coils (first and second coils), and a hall sensor. Furthermore, a driving magnet may be disposed on one of the moving part and the fixed part, and a driving coil may be disposed on the other. A movement distance of the lens assembly to be described below corresponding to such description may correspond to a movement distance of the moving part.

The shield can (not illustrated) may be positioned in one region (e.g., an outermost side) of the second camera actuator 1200 to surround components (the lens part 1220, the housing 1230, the driving part 1250, the base part 1260, the board part 1270, and the image sensor IS disposed on a circuit board at a rear end) to be described below.

The shield can (not illustrated) can block or reduce electromagnetic waves generated from the outside. Accordingly, it is possible to reduce the occurrence of a malfunction of the driving part 1250.

The lens part 1220 may be positioned in the shield can (not illustrated). The lens part 1220 may move in the third direction (the Z-axis direction or the optical axis direction). Therefore, the above-described AF function or zooming function may be performed.

In addition, the lens part 1220 may be positioned in the housing 1230. Accordingly, at least a part of the lens part 1220 may move in the optical axis direction or the third direction (the Z-axis direction) in the housing 1230.

Specifically, the lens part 1220 may include a lens group 1221 and a moving assembly 1222.

First, the lens group 1221 may include at least one lens. In addition, although the lens group 1221 may be provided as a plurality of lens groups, the following description will be given based on one lens group.

The lens group 1221 may be coupled to the moving assembly 1222 and moved in the third direction (the Z-axis direction) by an electromagnetic force generated from a first magnet 1252*a* and a second magnet 1252*b* that are coupled to the moving assembly 1222.

In an embodiment, the lens group 1221 may include a first lens group 1221*a*, a second lens group 1221*b*, and a third lens group 1221*c*. The first lens group 1221*a*, the second lens group 1221*b*, and the third lens group 1221*c* may be sequentially disposed in the optical axis direction. Furthermore, the lens group 1221 may further include a fourth lens group. The fourth lens group may be disposed at a rear end of the third lens group 1221*c*.

The first lens group 1221*a* may be fixedly coupled to a 2-1 housing (or a fixed assembly). That is, the first lens group 1221*a* may not move in the optical axis direction.

The second lens group 1221*b* may be coupled to a first lens assembly 1222*a* to move in the third direction or the optical axis direction. Magnification adjustment may be performed by moving the first lens assembly 1222*a* and the second lens group 1221*b*.

The third lens group 1221*c* may be coupled to the second lens assembly 1222*b* to move in the third direction or the optical axis direction. Focus adjustment or auto focusing may be performed by moving the third lens group 1221.

However, the present invention is not limited to the number of lens groups, and the above-described fourth lens group is not present, or an additional lens group or the like other than the fourth lens group 1121*d* may be further disposed.

The moving assembly 1222 may include an opening region surrounding the lens group 1221. The moving assembly 1222 is used interchangeably with the first and second lens assemblies. The moving assembly 1222 or the lens assembly may move in the optical axis direction (the Z-axis direction) in the housing 1230. In addition, the moving assembly 1222 may be coupled to the lens group 1221 by any method. In addition, the moving assembly 1222 may include a groove in a side surface thereof and may be coupled to the first magnet 1252*a* and the second magnet 1252*b* through the groove. A coupling member or the like may be applied to the groove.

In addition, the moving assembly 1222 may be coupled to the elastic parts (not illustrated) at an upper end and a rear end thereof. Therefore, the moving assembly 1222 may be supported by the elastic parts (not illustrated) while moving in the third direction (the Z-axis direction). That is, the position of the moving assembly 1222 may be maintained in the third direction (the Z-axis direction). The elastic part (not illustrated) may be formed of any elastic element such as a leaf spring.

The moving assembly 1222 may be positioned in the housing 1230 and may include the first lens assembly 1222*a* and a second lens assembly 1222*b*.

A region of the second lens assembly 1222*b* in which the third lens group is seated may be positioned at a rear end of the first lens assembly 1222*a*. That is, the region of the second lens assembly 1222*b* in which the third lens group 1221*c* is seated may be positioned between a region of the first lens assembly 1222*a* in which the second lens group 1221*b* is seated and the image sensor.

The first lens assembly 1222*a* and the second lens assembly 1222*b* may face a first guide part and a second guide part, respectively. The first guide part and the second guide part may be positioned on a first side portion 1232*a* and a second side portion 1232*b* of the housing 1230 (or the 2-2 housing) to be described below. The first guide part and the second guide part may be disposed integrally or separately on the first side portion 1232*a* and the second side portion 1232*b* of the housing 1230 (or the 2-2 housing) to be described below. The following description will be given based on an integrated type.

In addition, optical driving magnets may be seated on outer surfaces of the first lens assembly 1222*a* and the second lens assembly 1222*b*. For example, the second magnet 1252*b* may be seated on the outer surface of the second lens assembly 1222*b*. The first magnet 1252*a* may be seated on the outer surface of the first lens assembly 1222*a*. In the present specification, the first lens assembly 1222*a* may be used interchangeably with a "first bobbin." The second lens assembly 1222*b* may be used interchangeably with a "second bobbin."

The housing 1230 may be disposed between the lens part 1220 and the shield can (not illustrated). In addition, the housing 1230 may be disposed to surround the lens part 1220.

The housing 1230 may include a 2-1 housing 1231, a 2-2 housing 1232, and a cover base CB. The 2-1 housing 1231 may be coupled to the first lens group 1221*a* and may also be coupled to the above-described first camera actuator. The 2-1 housing 1231 may be positioned in front of the 2-2 housing 1232. The 2-1 housing may be referred to as a "fixed assembly," a "fixed lens assembly," a "fixed lens accommodation part," or the like. The 2-2 housing may be referred to as a "main barrel," a "lens barrel," a "barrel," or the like.

In addition, the 2-2 housing 1232 may be positioned at a rear end of the 2-1 housing 1231. The first and second lens assemblies and the lens part 1220 may be seated inside the 2-2 housing 1232.

Holes may be formed in side portions of the housing 1230 (or the 2-2 housing 1232). A first coil 1251*a* and a second coil 1251*b* may be disposed in the holes. The hole may be positioned to correspond to the above-described groove of the moving assembly 1222. In this case, the first coil 1251*a* and the second coil 1251*b* may each be formed as a plurality of coils.

In an embodiment, the housing 1230 (in particular, the 2-2 housing 1232) may include the first side portion 1232*a* and the second side portion 1232*b*. The first side portion 1232*a* and the second side portion 1232*b* may be positioned to correspond to each other. For example, the first side portion 1232*a* and the second side portion 1232*b* may be symmetrically disposed with respect to the third direction. An optical driving coil 1251 may be positioned on the first side portion 1232*a* and the second side portion 1232*b*. In addition, the board part 1270 may be seated on outer surfaces of the first side portion 1232*a* and the second side portion 1232*b*. That is, a first board may be positioned on the outer surface of the first side portion 1232*a*, and a second board may be positioned on the outer surface of the second side portion 1232*b*.

The cover base CB may be disposed between the 2-1 housing 1231 and the 2-2 housing 1232. The cover base CB can prevent the lens (e.g., the first lens group) positioned or accommodated in the 2-1 housing 1231 (or the fixed assembly) from being damaged by an impact. That is, the cover base CB may absorb the impact of the moving assembly when the moving assembly moves in the 2-2 housing 1232. Furthermore, a 1-1 stopper ST1*a* and a 1-2 stopper St1*b*, which will be described below, may be positioned on a rear surface or lower surface of the cover base CB. For example, the 1-1 stopper ST1*a* and the 1-2 stopper ST1*b* may be positioned between the cover base CB and the moving assembly (e.g., the first lens assembly). Accordingly, the moving assembly may be primarily in contact with the 1-1 stopper ST1*a* and the 1-2 stopper ST1*b*. Accordingly, the reliability of the lens group can be improved.

Furthermore, the cover base CB may be bonded to the 2-1 housing 1231 and the 2-2 housing 1232 by a bonding member (e.g., an epoxy). Accordingly, by adjusting the shape of the cover base CB, the 2-1 housing 1231 and the 2-2 housing 1232 may be easily bonded. In addition, by adding the cover base CB, the ease of manufacturing at least one of the 2-1 housing 1231 and the 2-2 housing 1232 can be secured.

Furthermore, the first guide part and the second guide part may be positioned on the first side portion 1232*a* and the second side portion 1232*b* of the housing 1230 (or the 2-2 housing 1232).

The first guide portion and the second guide portion may be positioned correspondingly. For example, the first guide part and the second guide part may be positioned to face each other with respect to the third direction (the Z-axis direction). In addition, at least parts of the first guide part and the second guide part may overlap each other in the second direction (the Y-axis direction).

The first guide part and the second guide part may include at least one groove (e.g., a guide groove) or recess. In addition, a first ball B1 or a second ball B2 may be seated in the groove or the recess. The second camera actuator 1200 may further include a ball part. The ball part may include the first ball B1 and the second ball B2. The first and second lens assemblies may be moved in the optical axis direction by the ball part. In this case, the ball part may include at least one rolling member or ball. In addition, at least one ball may move along guide grooves of the first and second guide parts. In addition, at least one ball may move along the recesses or grooves of the first and second lens assemblies. Accordingly, the first ball B1 or the second ball B2 may move in the third direction (the Z-axis direction) in the guide groove of the first guide part or the guide groove of the second guide part.

Alternatively, the first ball B1 or the second ball B2 may move in the third direction along a rail formed inside the first side portion 1232*a* of the housing 1230 or a rail formed inside the second side portion 1232*b* of the housing 1230.

Accordingly, the first lens assembly 1222*a* and the second lens assembly 1222*b* may move in the third direction or the optical axis direction. In this case, the second lens assembly 1222*b* may be disposed adjacent to or closer to the image sensor than the first lens assembly 1222*a*.

According to the embodiment, the first ball B1 may be in contact with the first lens assembly 1222*a*. The second ball B2 may be in contact with the second lens assembly 1222*b*. Accordingly, at least a part of the first ball B1 may overlap the second ball B2 in the first direction (the X-axis direction) depending on a position.

In addition, the first guide part and the second guide part may include a first guide groove facing a first recess RS1. In addition, the first guide part and the second guide part may include a second guide groove facing a second recess RS2. The first guide groove and the second guide groove may be grooves extending in the third direction (the Z-axis direction). In addition, the first guide groove and the second guide groove may be grooves having different shapes. For example, the first guide groove may be a groove with an inclined side surface, and the second guide groove may be a groove with a side surface perpendicular to a bottom surface thereof.

In addition, the first guide groove or the second guide groove may be formed as a plurality of guide grooves. In addition, a plurality of balls of which some have different diameters may be positioned in the plurality of guide grooves.

The second magnet 1252*b* may be positioned to face the second coil 1251*b*. In addition, the first magnet 1252*a* may be positioned to face the first coil 1251*a*.

For example, at least one of the first coil 1251*a* and the second coil 1251*b* may be formed as at least one coil. For example, the first coil 1251*a* may be formed as a plurality of coils. The second coil 1251*b* may be formed as a plurality of coils. In addition, even when the first coil and the second coil are each formed as one coil, a long stroke to be described below may be implemented.

In an embodiment, the optical driving coil 1251 may be formed of sub-coils sequentially disposed in the optical axis direction (the Z-axis direction). For example, a plurality of sub-coils may be sequentially disposed at each of both sides of the main barrel 1232 in the optical axis direction. The 2-2 housing may be used interchangeably with the "main barrel."

In the present embodiment, the optical driving part (or the driving part 1250) may include a first driving part and a second driving part. The first driving part may provide a driving force for moving the first lens assembly 1222*a* in the optical axis direction. The first driving part may include the first coil 1251*a* and the first magnet 1252*a*. In addition, the first driving part may include the first driving coil and the first driving magnet. Accordingly, the first coil 1251*a* may be referred to as the "first driving coil." In addition, the first magnet 1252*a* may be referred to as the "first driving magnet."

In addition, the second driving part may provide a driving force for moving the second lens assembly 1222*b* in the optical axis direction. The second driving part may include the second coil 1251*b* and the second magnet 1252*b*.

In addition, the second driving part may include the second driving coil and the second driving magnet. Accordingly, the second coil 1251*b* may be referred to as the "second driving coil." In addition, the second magnet 1252*b* may be referred to as the "second driving magnet."

The elastic part (not illustrated) may include a first elastic member (not illustrated) and a second elastic member (not illustrated). The first elastic member (not illustrated) may be coupled to an upper surface of the moving assembly 1222. The second elastic member (not illustrated) may be coupled to a lower surface of the moving assembly 1222. In addition, the first elastic member (not illustrated) and the second elastic member (not illustrated) may be formed of a leaf spring as described above. In addition, the first elastic member (not illustrated) and the second elastic member (not illustrated) may provide elasticity for moving the moving assembly 1222. However, the present invention is not limited to the above-described position, and the elastic part may be disposed at any position.

In addition, the driving part 1250 may provide a driving force for moving the lens part 1220 in the third direction (the Z-axis direction). The driving unit 1250 may include the optical driving coil 1251 and the optical driving magnet 1252. The optical driving coil 1251 and the optical driving magnet 1252 may be positioned to face each other. For example, the first driving coil 1251*a* and the first driving magnet 1252*a* may be positioned to face each other. In addition, the second driving coil 1251*b* and the second driving magnet 1252*b* may be positioned to face each other. The first driving coil 1251*a* may be positioned at one side in the second direction in the housing, and the second driving coil 1251*a* may be positioned at the other side in the second direction in the housing.

Furthermore, the driving part 1250 may further include a Hall sensor part. The Hall sensor part 1253 may include at least one first Hall sensor 1253*a* and at least one second Hall sensor 1253*b* and may be positioned inside or outside the optical driving coil 1251.

The moving assembly may move in the third direction (the Z-axis direction) by an electromagnetic force generated between the optical driving coil 1251 and the optical driving magnet 1252.

The optical driving coil 1251 may include the first coil 1251*a* and the second coil 1251*b*. In addition, as described above, the first coil 1251*a* and the second coil 1251*b* may each be formed of a plurality of sub-coils. In addition, the first coil 1251*a* and the second coil 1251*b* may be disposed in the holes formed in the side portions of the housing 1230. In addition, the first coil 1251*a* and the second coil 1251*b* may be electrically connected to the board part 1270. Accordingly, the first coil 1251*a* and the second coil 1251*b* may receive a current or the like through the board part 1270.

In addition, the optical driving coil 1251 may be coupled to the board part 1270 through a yoke or the like.

In addition, in an embodiment, the optical driving coil 1251 is a fixed element along with the board part 1270. In contrast, the optical driving magnet 1252 is a moving element that moves in the optical axis direction (the Z-axis direction) along with the first and second assemblies.

The optical driving magnet 1252 may include the first magnet 1252*a* and the second magnet 1252*b*.

In an embodiment, the first coil 1251*a* may include a first sub-coil SC1*a* and a second sub-coil SC2*a*. The first sub-coil SC1*a* and the second sub-coil SC2*a* may be sequentially disposed in the optical axis direction. The first sub-coil SC1*a* may be closer to the first camera actuator than the second sub-coil SC2*a*.

In addition, the second coil 1251*b* may include a third sub-coil SC1*b* and a fourth sub-coil SC2*b*. The third sub-coil SC1*b* and the fourth sub-coil SC2*b* may be sequentially disposed in the optical axis direction. The third sub-coil SC1*b* may be closer to the first camera actuator than the fourth sub-coil SC2*b*.

In addition, the first magnet 1252*a* may face the first sub-coil SC1*a* and the second sub-coil SC2*a*. The second magnet 1252*b* may face the third sub-coil SC1*b* and the fourth sub-coil SC2*b*. The first sub-coil SC1*a* may be positioned to overlap the third sub-coil SC1*b* in the second direction. The second sub-coil SC2*a* may be positioned to overlap the fourth sub-coil SC2*b* in the second direction. In this way, the first magnet 1252*a* and the second magnet 1252*b* may be positioned to face two sub-coils in the same manner.

Furthermore, the coils of the first and second driving parts in the second camera actuator may be described as including first sub-coils SC1*a* and SC1*b* and second sub-coils SC2*a* and SC2*b*. However, in the specification, the sub-coils driving the second lens assembly are described by being used interchangeably with the third sub-coil and the fourth sub-coil.

The first sub-coil SC1*a* and the second sub-coil SC2*a* may be disposed to be spaced apart from each other in the optical axis direction. The first sub-coil SC1*a* and the second sub-coil SC2*a* may be connected parallel to each other. For example, one of one end and the other end of the first sub-coil SC1*a* may be connected to one of one end and the other end of the second sub-coil SC2*a* at a single node. In addition, the other end of the one end and the other end of the first sub-coil SC1*a* may be connected to the other end of the one end and the other end of the second sub-coil SC2*a* at a different node. That is, a current applied to the first sub-coil SC1*a* and the second sub-coil SC2*a* may be distributed to each sub-coil. Accordingly, the first sub-coil SC1*a* and the second sub-coil SC2*a* may be electrically connected in parallel, thereby reducing heat generation.

In addition, a polarity of one surface of the first driving magnet 1252*a*, which faces the first driving coils SC1*a* and SC2*a*, may be the same as a polarity of one surface of the second driving magnet 1252*b*, which faces the second driving coils SC1*b* and SC2*b*. For example, an inner surface of the first driving magnet 1252*a* and an inner surface of the second driving magnet 1252*b* may have one (e.g., an N pole) of an N pole and an S pole. An outer surface of the first driving magnet 1252*a* and an outer surface of the second driving magnet 1252*b* may have the other (e.g., an S pole) of the N pole and the S pole. Here, the inner surface may be a side surface adjacent to the optical axis, and the outer surface may be a side surface away from the optical axis with respect to the optical axis. In addition, the first magnet 1252*a* may have a first pole on a first surface BSF1 facing the optical driving coil (e.g., the first coil). In addition, the first magnet 1252*a* may have a second pole on a second surface BSF2 that is a surface opposite to the first surface BSF1. The second magnet 1252*b* may have the first pole on the first surface BSF1 facing the optical driving coil (e.g., the second coil). In addition, the second magnet 1252*b* may have the second pole on the second surface BSF2 that is a surface opposite to the first surface BSF1. The first pole may be one of the N pole and the S pole. In addition, the second pole may be the other of the N pole and the S pole.

Alternatively, the first driving magnet and the second driving magnet may have a structure in which the N pole/S pole or the S pole/N pole are sequentially disposed in the optical axis direction.

In addition, the third sub-coil SC1*b* and the fourth sub-coil SC2*b* may be disposed to be spaced apart from each other in the optical axis direction. The third sub-coil SC1*b* and the fourth sub-coil SC2*b* may be connected parallel to each other. For example, one of one end and the other end of the third sub-coil SC1*b* may be connected to one of one end and the other end of the fourth sub-coil SC2*b* at a single node.

The first magnet 1252*a* and the second magnet 1252*b* may be disposed in the above-described groove of the moving assembly 1222 and positioned to correspond to the first coil 1251*a* and the second coil 1251*b*. In addition, the optical driving magnet 1252 may be coupled to the first and second lens assemblies (or the moving assembly) along with the yoke to be described below.

A yoke part 1240 may be disposed on the board part 1270. The yoke part 1240 may generate an attractive force with an adjacent magnet to maintain the attitudes of the first and second lens assemblies. That is, the yoke part 1240 may provide a holding force for the moving assembly. The yoke part 1240 may include a first yoke 1241 and a second yoke 1242. The first yoke 1241 may be disposed on a first board 1271. The second yoke 1242 may be disposed on a second board 1272.

The base part 1260 may be positioned between the lens part 1220 and the image sensor in the circuit board. A component such as a filter may be fixed to the base part 1260. In addition, the base part 1260 may be disposed to surround the above-described image sensor. With this configuration, since the image sensor is free from foreign substances and the like, it is possible to improve the reliability of the device. However, the following description will be given without this in some drawings.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a control unit.

In addition, the second camera actuator may be a fixed zoom or a continuous zoom. For example, the second camera actuator may provide the movement of the lens group 1221.

In addition, the second camera actuator may be formed of a plurality of lens assemblies. For example, in addition to the first lens assembly 1222*a* and the second lens assembly 1222*b*, at least one of a third lens assembly (not illustrated) and the guide pin (not illustrated) may be disposed in the second camera actuator. The above-described contents may be applied to the same. Accordingly, the second camera actuator may perform a high-magnification zooming function through the driving unit.

The image sensor may be positioned inside or outside the second camera actuator. In an embodiment, as illustrated, the image sensor may be positioned outside the second camera actuator. For example, the image sensor may be positioned on a circuit board. The image sensor may receive light and convert the received light into an electrical signal. In addition, the image sensor may include a plurality of pixels in the form of an array. In addition, the image sensor may be positioned on the optical axis.

The board part 1270 may be in contact with a side portion of the housing. For example, the board part 1270 may be positioned on an outer surface (a first side surface) of the first side portion and an outer surface (a second side surface) of the second side portion of the housing, in particular, the 2-2 housing and may be in contact with the first side surface and the second side surface.

The second camera actuator may further include the first stoppers ST1*a* and ST1*b* disposed at one end (or the front end) in the housing (or the 2-2 housing 1232) and the second stoppers ST2*a* and ST2*b* disposed at the other end (or the rear end).

A first stopper ST1 may be positioned at one end of the housing. For example, the first stopper ST1 may be positioned on an end portion of the 2-2 housing or the main barrel 1232 in a direction opposite to the optical axis direction. In an embodiment, the first stopper ST1 may be positioned on an inner side wall or an inner wall of the housing or the main barrel 1232. The first stopper ST1 may be positioned on a first inner wall among the first inner wall and a second inner wall of the main barrel 1232, which face each other in the optical axis direction. In addition, the first stopper ST1 may include the 1-1 stopper ST1*a* disposed at one side thereof and the 1-2 stopper ST1*b* disposed at the other side. For example, the 1-1 stopper ST1*a* may be disposed at one side of the first inner wall. In addition, the 1-2 stopper ST1*b* may be disposed at the other side of the first inner wall. The 1-1 stopper ST1*a* may be positioned adjacent to the first side portion. The 1-2 stopper ST1*b* may be positioned adjacent to the second side portion. One side and the other side may be one side and a side opposite to the one side in the second direction.

Alternatively, the 1-1 stopper ST1*a* may overlap a guiding part of the first lens assembly in the optical axis direction. The 1-2 stopper ST1*b* may overlap a lens protruding portion of the first lens assembly in the optical axis direction.

In addition, the first stopper ST1 may further include a 1-3 stopper disposed at the other side of the main barrel 1232. The 1-3 stopper may be positioned to overlap the guiding part of the second lens assembly 1222*b* in the optical axis direction.

For example, the second stopper ST2 may be disposed at the other end of the 2-2 housing or the main barrel 1232. For example, the second stopper ST2 may be positioned on an end portion of the 2-2 housing or the main barrel 1232 in the optical axis direction. In an embodiment, the second stopper ST2 may be positioned on the inner side wall or the inner wall of the housing or the main barrel 1232. The second stopper ST2 may be positioned on a second inner wall among the first inner wall and the second inner wall of the main barrel 1232, which face each other in the optical axis direction. The first inner wall may be adjacent to the first camera actuator or the first lens assembly. The second inner wall may be adjacent to the image sensor.

In addition, the second stopper ST2 may include a 2-1 stopper ST2*a* disposed at one side thereof and a 2-2 stopper ST2*b* disposed at the other side. The 2-1 stopper ST2*a* may be positioned adjacent to the first side portion. The 2-2 stopper ST2*b* may be positioned adjacent to the second side portion. For example, the 2-1 stopper ST2*a* may be disposed at one side of the first inner wall. In addition, the 2-2 stopper ST2*b* may be disposed at the other side of the first inner wall.

Referring to FIGS. 7 and 8, hereinafter, an electromagnetic force will be described below based on one coil. In a camera device according to an embodiment, an electromagnetic force DEM1 may be generated between the fourth magnet 1252*a* and the fourth coil 1251*a* so that the first lens assembly 1222*a* may move along the rail positioned on the inner surface of the housing through the first ball B1 in a direction parallel to the optical axis, that is, the third direction (the Z-axis direction) or in a direction opposite to the third direction. In this case, the first magnet 1252*a* and the second magnet 1252*b* do not move to regions facing edges of the first and second sub-coils. Accordingly, an electromagnetic force is generated based on a flow of a current in adjacent regions of the first sub-coil and the second sub-coil.

As described above, in the camera device according to the embodiment, the first magnet 1252*a* may be, for example, provided in the first lens assembly 1222*a* by a unipolar magnetization method. For example, in an embodiment, a surface (a first surface) facing an outer surface of the first magnet 1252*a* may be an S pole. In addition, the outer surface of the first magnet 1252*a* may be a surface facing the first coil 1251*a*. In addition, a surface opposite to the first surface may be an N pole. Accordingly, only one of the N pole and the S pole may be positioned to face the first coil 1251*a*. Here, the description will be given based on the outer surface of the first magnet 1252*a* being the S pole. Furthermore, the first coil 1251*a* is composed of a plurality of sub-coils, and a current may flow in opposite directions in the plurality of sub-coils. That is, in a region of the first sub-coil SC1*a*, which is adjacent to the second sub-coil SC2*a*, a current may flow in the same manner as 'DE1.' That is, a first region of the first sub-coil SC1*a* and a second region of the second sub-coil SC2*a* may have the same current direction. The first region of the first sub-coil SC1*a* is a region that overlaps the first driving magnet 1252*a* in a direction (the second direction) perpendicular to the optical axis direction and is disposed perpendicular to the optical axis direction (e.g., disposed in the first direction). The second region of the first sub-coil SC2*a* is a region that overlaps the first driving magnet 1252*a* in a direction (the second direction) perpendicular to the optical axis direction and is disposed perpendicular to the optical axis direction (e.g., disposed in the first direction).

In addition, as illustrated, in an embodiment, when a magnetic force is applied from the S pole of the first magnet 1252*a* in the second direction (the Y-axis direction) and the current DE1 flows in the second coil 1251*a* in the first direction (the X-axis direction), the electromagnetic force DEM1 may act in the third direction (the Z-axis direction) according to the interaction of the electromagnetic force (e.g., Fleming's left hand rule).

In this case, since the first coil 1251*a* is fixed to the side portion of the housing, the first lens assembly 1222*a* on which the first magnet 1252*a* is disposed may be moved in a direction opposite to the Z-axis direction by the electromagnetic force DEM1 according to the current direction. That is, the optical driving magnet may move in a direction opposite to the electromagnetic force applied to the optical driving coil. In addition, the direction of the electromagnetic force may be changed depending on the current of the coil and the magnetic force of the magnet.

Accordingly, the first lens assembly 1222*a* may move along the rail positioned on the inner surface of the housing through the first ball B1 in a direction (both directions) parallel to the third direction or the optical axis direction. In this case, the electromagnetic force DEM1 may be controlled in proportion to the current DE1 applied to the first coil 1251*a*.

The first lens assembly 1222*a* or the second lens assembly 1222*b* may include the first recess RS1 in which the first ball B1 or the second ball B2 is seated. In addition, the first lens assembly 1222*a* or the second lens assembly 1222*b* may include the second recess RS2 in which the first ball B1 or the second ball B2 is seated. The first recess RS1 and the second recess RS2 may each be formed as a plurality of recesses. A length of the first recess RS1 in the optical axis direction (the Z-axis direction) may be preset. In addition, a length of the second recess RS2 in the optical axis direction (the Z-axis direction) may be preset. Accordingly, movement distances of the first ball and the second ball in the optical axis direction in the recesses may be adjusted. That is, the first recess RS1 or the second recess RS2 may be a stopper for the first or second ball.

In addition, in the camera device according to the embodiment, the second magnet 1252*b* may be, for example, provided on the second lens assembly 1222*b* by the unipolar magnetization method.

Furthermore, the first coil 1251*a* is composed of a plurality of sub-coils, and a current may flow in opposite directions in the plurality of sub-coils. That is, in a region of the first sub-coil SC1*a*, which is adjacent to the second sub-coil SC2*a*, a current may flow in the same manner as 'DE1.'

In addition, in an embodiment, one of an N pole and S pole of the second magnet 1252*b* may be positioned to face the second coil 1251*b*. In addition, in an embodiment, a surface (a first surface) facing an outer surface of the second magnet 1252*b* may be an S pole. In addition, the first surface may be an N pole. As illustrated, the following description will be given based on the first surface being the N pole.

Furthermore, the second coil 1251*b* is composed of a plurality of sub-coils, and a current may flow in opposite directions in the plurality of sub-coils. That is, in a region of the first sub-coil SC1*b*, which is adjacent to the second sub-coil SC2*b*, a current may flow in the same manner as 'DE2.'

In an embodiment, when a magnetic force DM2 is applied from the first surface (the N pole) of the second magnet 1252*b* in the second direction (the Y-axis direction) and the current DE2 flows in the second coil 1251*b* corresponding to the N pole in the first direction (the X-axis direction), an electromagnetic force DEM2 may act in the third direction (the Z-axis direction) according to the interaction of the electromagnetic force (e.g., Fleming's left hand rule).

In this case, since the second coil 1251*b* is fixed to the side portion of the housing, the second lens assembly 1222*b* on which the second magnet 1252*b* is disposed may be moved in the direction opposite to the Z-axis direction by the electromagnetic force DEM2 according to the current direction. For example, as described above, the direction of the electromagnetic force may be changed depending on the current of the coil and the magnetic force of the magnet. Accordingly, the second lens assembly 1222*b* may move along the rail positioned on the inner surface of the housing through the second ball B2 in a direction parallel to the third direction (the Z-axis direction). In this case, the electromagnetic force DEM2 may be controlled in proportion to the current DE2 applied to the second coil 1251*b*.

Referring to FIG. 9, in the camera device according to the embodiment, the driving part may provide driving forces F3A, F3B, F4A, and F4B that move the first lens assembly 1222*a* and the second lens assembly 1222*b* of the lens part 1220 in the third direction (the Z-axis direction). As described above, the driving part may include the optical driving coil 1251 and the optical driving magnet 1252. In addition, the lens part 1220 may be moved in the third direction (the Z-axis direction) by the electromagnetic force generated between the optical driving coil 1251 and the optical driving magnet 1252.

In this case, the first coil 1251*a* and the second coil 1251*b* may be disposed in the holes formed in the side portions (e.g., the first side portion and the second side portion) of the housing 1230. In addition, the second coil 1251*b* may be electrically connected to the second board 1272. The first coil 1251*a* may be electrically connected to the first board 1271. Accordingly, the first coil 1251*a* and the second coil 1251*b* may receive a driving signal (e.g., a current) from a driving driver on the circuit board of the circuit board 1300 through the board part 1270.

In this case, the first lens assembly 1222*a* on which the first magnet 1252*a* is seated may be moved in the third direction (the Z-axis direction) by the electromagnetic forces F3A and F3B between the first coil 1251*a* and the first magnet 1252*a*. In addition, the second lens group 1221*b* seated on the first lens assembly 1222*a* may also move in the third direction.

In addition, the second lens assembly 1222*b* on which the second magnet 1252*b* is seated may be moved in the third direction (the Z-axis direction) by the electromagnetic forces F4A and F4B between the second coil 1251*b* and the second magnet 1252*b*. In addition, the third lens group 1221*c* seated on the second lens assembly 1222*b* may also move in the third direction.

Therefore, as described above, a focal length or magnification of the optical system may be changed by moving the second lens group 1221*b* and the third lens group 1221*c*. In an embodiment, magnification may be changed by moving the second lens group 1221*b*. That is, zooming may be performed. In addition, a focus may be adjusted by moving the third lens group 1221*c*. That is, auto focusing may be performed.

In addition, the second camera actuator may be a fixed zoom or a continuous zoom depending on the movement method of the second lens group (or the third lens group).

Furthermore, the first Hall sensor 1253*a* and the second Hall sensor 1253*b* may be disposed on at least one of the first sub-coil and the second sub-coil. For example, the first Hall sensor 1253*a* and the second Hall sensor 1253*b* may overlap each other in the second direction. Alternatively, the first Hall sensor 1253*a* and the second Hall sensor 1253*b* may not overlap each other in the second direction. Alternatively, the first Hall sensor 1253*a* and the second Hall sensor 1253*b* may partially overlap each other in the second direction.

According to the driving of the first lens assembly, the first lens assembly 1222*a* may be positioned as close as possible to the first stoppers ST1*a* and ST1*b*. In this case, a distance of the first lens assembly 1222*a* between the guiding portion and the 1-1 stopper ST1*a* may decrease. In addition, a distance between the 1-2 stopper ST1*b* and the lens protruding portion of the first lens assembly may also decrease.

That is, when the first lens assembly 1222*a* maximally moves toward the first camera actuator, the first lens assembly 1222*a* may collide with the 1-1 stopper ST1*a* and the 1-2 stopper ST1*b*. The 1-1 stopper and the 1-2 stopper may collide simultaneously or sequentially with the movement of the first lens assembly. In the present embodiment, the 1-1 stopper and the 1-2 stopper may collide simultaneously with the movement of the first lens assembly.

Accordingly, even when a lens made of glass is disposed in the first lens assembly 1222*a* (or the second lens assembly) (e.g., a frontmost end), the collision at a mecha position of the first lens assembly 1222*a* (or the second lens assembly) can be minimized. That is, a cracking phenomenon of the lens can be suppressed. For example, at least one of the first lens assembly and the second lens assembly may include a lens including glass. In addition, the glass may be positioned at the outermost side in the first lens assembly or the second lens assembly.

As a modified example, when a sequential collision occurs, shock absorption may occur primarily in the guiding part having a large volume or the like, thereby minimizing damage to the first lens assembly.

Likewise, the 2-2 stopper ST2*b* may collide with the second lens assembly 1222*b*. That is, when the second lens assembly 1222*b* maximally moves toward the image sensor or in the optical axis direction, the second lens assembly 1222*b* may collide with the 2-2 stopper ST2*b* and the 2-1 stopper ST2*a*. Accordingly, even when a lens made of glass is disposed in the second lens assembly 1222*b*, a collision at the mecha position of the first lens assembly 1222*a* can be minimized. That is, a cracking phenomenon of the lens can be suppressed. The case of the modified example is also the same.

That is, when the first lens assembly 1222*a* moves, the 1-1 stopper ST1*a* and the 1-2 stopper ST1*b* may be in contact with the first lens assembly 1222*a*. When the first lens assembly 1222*a* maximally moves in a mecha-to-mecha manner, the first lens assembly 1222*a* may be in contact with the first stoppers ST1*a* and ST1*b*. For example, the first lens assembly 1222*a* may move to an end portion in the optical axis direction or an end portion in the direction opposite to the optical axis direction. In this case, the first lens assembly 1222*a* may move to a point at which it is in contact with the first stopper or the second stopper. For example, when the first lens assembly 1222*a* moves, the camera module may be in a tele or wide state. When the first lens assembly 1222*a* is in contact with the first stopper, the camera module may be in a wide state, and when the first lens assembly 1222*a* is in contact with the second stopper, the camera module may be in a tele state.

The impact according to the movement of the first lens assembly 1222*a* and the second lens assembly 1222*b* can be reduced by the first stopper. Accordingly, as described above, it is possible to improve the reliability of the first lens assembly 1222*a* and the second lens assembly 1222*b* and the reliability of the second lens group and the third lens group therein. Furthermore, since movement ranges of the first lens assembly 1222*a* and the second lens assembly 1222*b* are limited, driving of accurate magnification or the like may be performed.

FIG. 10 is a perspective view of some components of the second camera actuator according to the embodiment.

Referring to FIG. 10, the first lens assembly 1222*a* and the second lens assembly 1222*b* may be disposed to be spaced apart from each other in the optical axis direction (the Z-axis direction).

The second guide part may be disposed to face the first guide part. In an embodiment, at least parts of the first guide part and the second guide part may overlap each other in the second direction (the Y-axis direction). With this configuration, it is possible to increase the space efficiency of the driving part for moving the first and second lens assemblies in the second camera actuator, thereby easily miniaturizing the second camera actuator.

As described above, the first ball, the first coil, and the like may be disposed adjacent to each other, and the second ball, the second coil, and the like may be disposed adjacent to each other.

In addition, according to the embodiment, each of the first and second lens assemblies 1222*a* and 1222*b* may include yokes YK1 and YK2 disposed on the side surfaces thereof.

A first yoke YK1 may be positioned on the side surface of the first lens assembly 1222*a*. A second yoke YK2 may be positioned on the side surface of the second lens assembly 1222*b*. At least parts of the first yoke YK1 and the second yoke YK2 may extend outward. Accordingly, the first yoke YK1 may surround at least a part of a side surface of the first magnet 1252*a*. As illustrated, the first yoke YK1 may be formed in various structures that surround an inner surface and a part of the side surface of the first magnet 1252*a*. For example, the first yoke YK1 may be formed of partitioned members, and each partitioned member may be positioned on the inner surface and a part of the side surface of the first magnet 1252*a*. Accordingly, it is possible to increase bonding strength between the unipolarly magnetized optical driving magnet and the yoke. Likewise, the second yoke YK2 may surround at least a part of the side surface of the second magnet 1252*b*. As illustrated, the second yoke YK2 may be formed in various structures that surround an inner surface and a part of the side surface of the second magnet 1252*b*. For example, the second yoke YK2 may be formed of partitioned members, and each partitioned member may be positioned on the inner surface and a part of the side surface of the second magnet 1252*b*.

Furthermore, the yoke may be positioned to be coupled to both the optical driving coil and the optical driving magnet.

In addition, a plurality of balls may be positioned on the outer surface of the lens assembly. As described above, the first ball may be positioned on the outer surface of the first lens assembly 1222*a*. The second ball may be positioned on the outer surface of the second lens assembly 1222*b*.

The first ball and the second ball may each be formed as a plurality of balls. For example, the first ball may be formed as a plurality of balls and disposed side by side in the optical axis direction (the Z-axis direction) in one recess of the first lens assembly 1222*a*. In addition, the second ball may be formed as a plurality of balls and disposed side by side in the optical axis direction (the Z-axis direction) in one recess of the second lens assembly 1222*b*.

For example, the second ball B2 may include a first sub-ball B2*a*, a second sub-ball B2*b*, and a third sub-ball B2*c*. The first sub-ball B2*a*, the second sub-ball B2*b*, and the third sub-ball B2*c* may be disposed side by side in the optical axis direction. Accordingly, the first sub-ball B2*a*, the second sub-ball B2*b*, and the third sub-ball B2*c* may at least partially overlap each other in the optical axis direction.

In addition, the first sub-ball B2*a* and the second sub-ball B2*b* may be positioned at edges among the plurality of balls. The third sub-ball B2*c* may be positioned between the first sub-ball B2*a* and the second sub-ball B2*b*.

The plurality of balls may have the same or different diameters. For example, at least some of diameters R1, R3, and R2 of the first sub-ball B2*a*, the second sub-ball B2*b*, and the third sub-ball B2*c* may be the same. In addition, the diameters R1, R3, and R2 of the first sub-ball B2*a*, the second sub-ball B2*b*, and the third sub-ball B2*c* may be different.

In an embodiment, the diameters R1 and R3 of the balls (the first and second sub-balls) positioned at the edges may be smaller than the diameter R2 of the balls (the third sub-ball) positioned therein among the plurality of balls. For example, the diameters R1 and R3 of the first sub-ball B2*a* and the second sub-ball B2*b* may be smaller than the diameter R2 of the third sub-ball B2*c*. With this configuration, the movement of the lens assembly by the plurality of balls can be performed accurately without being biased to one side.

The description of the plurality of balls may be applied to the first ball in the same manner.

In addition, the optical driving magnet may be formed as a plurality of optical driving magnets as described above and formed of the first magnet and the second magnet. In addition, the first magnet and the second magnet may be disposed to face each other and have the same pole disposed outside. That is, the first surface (the outer surface) of the first magnet and the first surface (the outer surface) of the second magnet may have the first pole. In addition, the second surface (the inner surface) of the first magnet and the second surface (the inner surface) of the second magnet may have the second pole.

FIG. 11 is a view for describing parts of a 2-1 housing, a first lens assembly, a second lens assembly, and a driving part in the second camera actuator according to the embodiment, FIG. 12 is a view for describing a part of a first driving part and a first board in the second camera actuator according to the embodiment, FIGS. 13 to 15 are views illustrating various usage examples of FIG. 12, FIG. 16 is a view illustrating a part of a second driving part and a second board in the second camera actuator according to the embodiment, and FIG. 17 is a side view illustrating a part of the driving part in the second camera actuator according to the embodiment.

Referring to FIG. 11, in the second camera actuator according to the embodiment, the 2-1 housing 1231, the first lens assembly 1222*a*, and the second lens assembly 1222*b* may be positioned inside the board part 1270. That is, the board part 1270 may be disposed outside the driving part.

As described above, the driving part may include the first driving part and the second driving part. The first driving part may include the first coil 1251*a*, the first magnet facing the first coil 1251*a*, and the first Hall sensor 1253*a*. In addition, the second driving part may include the second coil 1251*b*, the second magnet facing the second coil 1251*b*, and the second Hall sensor 1253*b*.

The coil and the Hall sensor of the driving part may be disposed on an inner surface of the board part and electrically connected to the inner surface (e.g., the terminal) of the board part.

Specifically, the first coil 1251*a* and the first Hall sensor 1253*a* of the first driving part may be disposed on the board part 1270. In addition, the first coil 1251*a* and the first Hall sensor 1253*a* may be electrically connected to the board part 1270. In an embodiment, the first coil 1251*a* and the first Hall sensor 1253*a* may be disposed on the first board 1271 of the board part 1270. In addition, the first coil 1251*a* and the first Hall sensor 1253*a* may be electrically connected to the first board 1271 of the board part 1270.

In addition, the second coil 1251*b* and the second Hall sensor 1253*b* of the second driving part may be placed on the board part 1270. In addition, the second coil 1251*b* and the second Hall sensor 1253*b* may be electrically connected to the board part 1270. In an embodiment, the second coil 1251*b* and the second Hall sensor 1253*b* may be disposed on the second board 1272 of the board part 1270. In addition, the second coil 1251*b* and the second Hall sensor 1253*b* may be electrically connected to the second board 1272 of the board part 1270.

In an embodiment, the driving part may include the first coil 1251*a* and the second coil 1252*b* that include a plurality of sub-coils.

In addition, the driving part may include the first Hall sensor 1253*a* and the second Hall sensor 1253*b* that include a plurality of sub-Hall sensors.

In an embodiment, the first Hall sensor 1253*a* including the plurality of sub-Hall sensors may be disposed on or within the first coil 1251*a*. Furthermore, in the first Hall sensor 1253*a*, at least one of the plurality of sub-Hall sensors may be disposed so that a long side thereof is misaligned with another Hall sensor. That is, the plurality of sub-Hall sensors may be disposed sequentially in the optical axis direction (the Z-axis direction), but at least one of the plurality of sub-Hall sensors may not be parallel to the remaining sub-Hall sensors. For example, the sub-Hall sensor may have a quadrangular shape in a plan view. In this case, one and the other of the plurality of sub-Hall sensors may be disposed so that edges (or long sides/short sides or corners) are not parallel (not parallel) and are disposed to be misaligned.

The first coil 1251*a* may include the first sub-coil SC1*a* and the second sub-coil SC2*a* that are sequentially disposed in the optical axis direction. The first sub-coil SC1*a* and the second sub-coil SC2*a* may be disposed in the main barrel. In an embodiment, the first sub-coil SC1*a* and the second sub-coil SC2*a* may be positioned on a first side portion of the main barrel.

The first Hall sensor 1253*a* may be disposed in at least one of the first sub-coil SC1*a* and the second sub-coil SC2*a*. In an embodiment, the first Hall sensor 1253*a* may be disposed in the first sub-coil SC1*a*.

The first Hall sensor 1253*a* may include a plurality of sub-Hall sensors as described above. The plurality of sub-Hall sensors (or the first-Hall sensors 1253*a*) may include a first sub-Hall sensor HS1, a second sub-Hall sensor HS2, a third sub-Hall sensor HS3, and a fourth sub-Hall sensor HS4 that are sequentially disposed in the optical axis direction.

The first sub-Hall sensor HS1, the second sub-Hall sensor HS2, the third sub-Hall sensor HS3, and the fourth sub-Hall sensor HS4 may be positioned in the holes (or the coil holes) of the first sub-coil SC1*a*.

The second coil 1251*b* may include the third sub-coil SC1*b* and the fourth sub-coil SC2*b* that are sequentially disposed in the optical axis direction. The third sub-coil SC1*b* and the fourth sub-coil SC2*b* may be disposed in the main barrel. In an embodiment, the third sub-coil SC1*b* and the fourth sub-coil SC2*b* may be positioned on a second side portion of the main barrel.

The second Hall sensor 1253*b* may be disposed in at least one of the third sub-coil SC1*b* and the fourth sub-coil SC2*b*. In an embodiment, the second Hall sensor 1253*b* may be disposed in the first sub-coil SC1*b*.

The second Hall sensor 1253*b* may include a plurality of sub-Hall sensors as described above. The plurality of sub-Hall sensors (or the second-Hall sensors 1253*b*) may include a fifth sub-Hall sensor HS5, a sixth sub-Hall sensor HS6, a seventh sub-Hall sensor HS7, and an eighth sub-Hall sensor HS8 that are sequentially disposed in the optical axis direction.

The fifth sub-Hall sensor HS5, the sixth sub-Hall sensor HS6, the seventh sub-Hall sensor HS7, and the eighth sub-Hall sensor HS8 may be positioned in the holes (or the coil holes) of the third sub-coil SC1*b*.

In addition, a length of the second coil 1251*b* in the optical axis direction (the Z-axis direction) may differ from a length of the first coil 1251*a* in the optical axis direction. For example, the length of the second coil 1251*b* in the optical axis direction (the Z-axis direction) may be greater than the length of the first coil 1251*a* in the optical axis direction.

In addition, a length of the first sub-coil SC1*a* or the second sub-coil SC2*a* in the optical axis direction may be smaller than a length of the third sub-coil SC1*b* or the fourth sub-coil SC2*b* in the optical axis direction. Alternatively, the length of the third sub-coil SC1*b* or the fourth sub-coil SC2*b* in the optical axis direction may be greater than the length of the first sub-coil SC1*a* or the second sub-coil SC2*a* in the optical axis direction.

In addition, the first coil 1251*a* and the second coil 1251*b* may be positioned asymmetrically with respect to the optical axis. That is, there may be a difference in maximum movement distances between the first lens assembly and the second lens assembly corresponding to a difference between the lengths of the first coil 1251*a* and the second coil 1251*b*. Accordingly, it is possible to easily design a lens assembly or a movement assembly, which has different strokes.

In addition, the first coil 1251*a* and the second coil 1251*b* may be misaligned in at least some regions in the direction (the second direction, that is, the Y-axis direction) perpendicular to the optical axis. That is, the first coil 1251*a* and the second coil 1251*b* may not partially overlap each other in the second direction.

Furthermore, as described above, the first Hall sensor 1253*a* and the second Hall sensor 1253*b* may be disposed in sub-coils facing each other or disposed in sub-coils disposed to be misaligned.

In addition, in an embodiment, depending on the unipolar magnetization of the optical driving magnet, a current may flow in different directions in the first sub-coil SC1*a* and the second sub-coil SC2*a*. For example, the current may flow in one of clockwise and counterclockwise in the first sub-coil SC1*a*, and the current may flow in the other of clockwise and counterclockwise in the second sub-coil SC2*a*. Hereinafter, this may also be applied to the third sub-coil and the fourth sub-coil.

Referring further to FIG. 12, the first sub-coil SC1*a* may include a first terminal TM11 extending to the inside of the hole (the coil hole) of the first sub-coil SC1*a* and a second terminal TM12 extending to the outside (in a direction opposite to the inside of the coil hole) of the first sub-coil SC1*a*.

Correspondingly, the first board 1271 of the board part 1270 may include a first connection point CT11 in contact with the first terminal TM11 and a second connection point CT12 in contact with the second terminal TM12. Furthermore, the first board 1271 may include a third connection point CT21 connected to a third terminal TM21 extending to the inside of the hole of the second sub-coil SC2*a* and a fourth connection point CT22 connected to a fourth terminal TM22 extending to the outside of the second sub-coil.

The first connection point CT11 and the second connection point CT12 may be connection terminals for electrically connecting the first sub-coil SC1*a* to the first board 1271. For example, the first connection point CT11 and the second connection point CT12 may be bonding regions or connection points for electrical connection.

The first sub-coil SC1*a* and the second sub-coil SC2*a* that are the first coil may be connected to an inner surface 1271IS of the first board 1271 of the board part. In addition, the plurality of sub-Hall sensors HS1 to HS4 may be disposed on the inner surface 1271IS of the first board 1271 of the board part.

The first connection point CT11 and the second connection point CT12 may be disposed to be spaced apart from each other. In addition, the first connection point CT11 may be positioned to correspond to a position of the first terminal TM11. The second connection point CT12 may be positioned to correspond to a position of the second terminal TM12.

Specifically, at least one of the plurality of sub-Hall sensors may be positioned adjacent to the first connection point CT11. For example, the first sub-Hall sensor HS1 may be positioned adjacent to the first connection point CT11. Accordingly, a distance between the first sub-Hall sensor HS1 and the first connection point CT11 may be smaller than a distance between the other sub-Hall sensors (the second sub-Hall sensor to the fourth sub-Hall sensor) and the first connection point CT11.

In addition, the first Hall sensor 1253*a* may have a distance spaced apart from the first sub-coil SC1*a* in the optical axis direction that is smaller than a distance spaced apart from the first sub-coil SC1*a* in the first direction. That is, due to the arrangement of the first Hall sensor 1253*a* in the first sub-coil SC1*a*, a connection point for electrical connection may be formed on an upper or lower portion of the first Hall sensor 1253*a*. That is, the length of the second camera actuator in the optical axis direction is formed compactly according to the stroke, and a space in which the sub-coil and the board are electrically connected can be easily secured.

In an embodiment, at least one of the plurality of sub-Hall sensors may be disposed adjacent to the first connection point CT11 and may overlap the first connection point CT11 in the first direction (the X-axis direction). In this case, at least one of the plurality of sub-Hall sensors may be disposed to be tilted unlike the other Hall sensors. As described above, the first sub-Hall sensor HS1 may overlap the first connection point CT11 in the first direction, and a long side HS1*s* of the first sub-Hall sensor HS1 may be not parallel or not parallel to long sides (e.g., HS2*s*) of the second to fourth sub-Hall sensors HS2 to HS4.

With this configuration, it is possible to prevent a processing problem or an external exposure problem of an electromagnetic force, which occurs when the first terminal TM11 and the second terminal TM22 extend to the outside of the first sub-coil or the outer surface of the first board through the groove or hole of the first board 1271. Furthermore, since the first terminal TM11 and the first connection point CT11 are easily connected, it is possible to improve the reliability of the Hall sensor.

Furthermore, referring further to FIGS. 13 to 15, at least one of the plurality of sub-Hall sensors according to the embodiment may overlap the first connection point CT11 in the first direction (the X-axis direction). At least one of the plurality of sub-Hall sensors may overlap the first connection point CT11 in the first direction (the X-axis direction) for connection.

In addition, depending on various usage examples, the long side HS1*s* of the first sub-Hall sensor HS1 may not be parallel to the long sides (e.g., HS2*s*) of the second sub-Hall sensor HS2, the third sub-Hall sensor HS3, and the fourth sub-Hall sensor HS4.

For example, the long side HS1*s* of the first sub-Hall sensor HS1 and the long side HS2*s* of the second sub-Hall sensor HS2 may have predetermined angles θ1 to θ3. For example, the predetermined angles θ1 to θ3 may not be 180 degrees. In addition, the predetermined angles θ1 to θ3 may vary in various ways depending on the position of the first connection point CT11 or the like.

In addition, another Hall sensor among the plurality of sub-Hall sensors may be disposed to be misaligned with the first connection point CT11 in the first direction (the X-axis direction). The second sub-Hall sensor HS2, the third sub-Hall sensor HS3, and the fourth sub-Hall sensor HS4 may be disposed to be misaligned with the first connection point CT11 in the first direction (the X-axis direction). For example, the second sub-Hall sensor HS2, the third sub-Hall sensor HS3, and the fourth sub-Hall sensor HS4 may not overlap the first connection point CT11 in the first direction.

In addition, when the first connection point CT11 overlaps the first sub-Hall sensor HS1 in the first direction (the X-axis direction), the first connection point CT11 may be disposed between the first sub-Hall sensor HS1 and the first sub-coil SC1*a* or positioned in a region between the first sub-Hall sensor HS1 and the second sub-Hall sensor HS2. That is, when the first sub-Hall sensor HS1 is tilted, the first connection point CT11 may be positioned at a left or right side adjacent to the first connection point CT11 for maximum space utilization.

In addition, the first connection point CT11 may overlap the second sub-Hall sensor HS2 in the first direction (the X-axis direction).

For example, the long side HS1*s* of the first sub-Hall sensor HS1 and the long side HS2*s* of the second sub-Hall sensor HS2 may have predetermined angles θ4 to θ6. In this case, the second sub-Hall sensor HS2 may be tilted differently from the other sub-Hall sensors. In addition, the predetermined angles 04 to 06 may not be 180 degrees.

In addition, other Hall sensors (the first sub-Hall sensor, the third sub-Hall sensor, and the fourth sub-Hall sensor) among the plurality of sub-Hall sensors may be disposed to be misaligned with the first connection point CT11 in the first direction (the X-axis direction). The first sub-Hall sensor HS1, the third sub-Hall sensor HS3, and the fourth sub-Hall sensor HS4 may be disposed to be misaligned with the first connection point CT11 in the first direction (the X-axis direction). For example, the first sub-Hall sensor HS1, the third sub-Hall sensor HS3, and the fourth sub-Hall sensor HS4 may not overlap the first connection point CT11 in the first direction.

Even when at least one of the plurality of sub-Hall sensors is tilted differently from the remaining Hall sensors, the plurality of sub-Hall sensors according to the embodiment may have the same distance between the adjacent sub-Hall sensors and centers of the sub-Hall sensors. That is, the first sub-Hall sensor HS1, the second sub-Hall sensor HS2, the third sub-Hall sensor HS3, and the fourth sub-Hall sensor HS4 may have the same separation distance between the adjacent sub-Hall sensors and centers of the first to fourth sub-Hall sensors.

For example, a center CP1 of the first sub-Hall sensor HS1, a center CP2 of the second sub-Hall sensor HS2, a center CP3 of the third sub-Hall sensor HS3, and a center CP4 of the fourth sub-Hall sensor HS4 may overlap each other in the optical axis direction. Furthermore, the center CP1 of the first sub-Hall sensor HS1, the center CP2 of the second sub-Hall sensor HS2, the center CP3 of the third sub-Hall sensor HS3, and the center CP4 of the fourth sub-Hall sensor HS4 may have the same distance from the centers of the adjacent sub-Hall sensors. Accordingly, it is possible to maintain the driving accuracy of the first sub-Hall sensor HS1, the second sub-Hall sensor HS2, the third sub-Hall sensor HS3, and the fourth sub-Hall sensor HS4 and secure the space for electrical connection.

The above-described contents of the first coil and the first Hall sensor may be applied to the second coil and the second Hall sensor in the same manner.

In addition, the fourth sub-coil SC2*b* may include a seventh terminal TM41 extending to the inside of the hole (the coil hole) of the fourth sub-coil SC2*b* and an eighth terminal TM42 extending to the outside (in a direction opposite to the inside of the coil hole) of the fourth sub-coil SC2*b*.

Correspondingly, the second board 1272 of the board part 1270 may include a seventh connection point CT41 in contact with the seventh terminal TM41 and an eighth connection point CT42 in contact with the eighth terminal TM42. Furthermore, the second board 1272 may include a fifth connection point CT31 connected to a fifth terminal TM31 extending to the inside of the hole of the third sub-coil SC1*b* and a sixth connection point CT22 connected to a sixth terminal TM32 extending to the outside of the third sub-coil.

The seventh connection point CT41 and the eighth connection point CT42 may be connection terminals for electrically connecting the fourth sub-coil SC2*b* to the second board 1272. For example, the seventh connection point CT41 and the eighth connection point CT42 may be bonding regions or connection points for electrical connection.

The third sub-coil SC1*b* and the fourth sub-coil SC2*b* that are the second coil may be connected to an inner surface 1272IS of the second board 1272 of the board part. In addition, the plurality of sub-Hall sensors HS5 to HS8 may be disposed on the inner surface 1272IS of the second board 1272 of the board part.

The seventh connection point CT41 and the eighth connection point CT42 may be disposed to be spaced apart from each other. In addition, the seventh connection point CT41 may be positioned to correspond to a position of the seventh terminal TM41. The eighth connection point CT42 may be positioned to correspond to a position of the eighth terminal TM42.

Specifically, at least one of the plurality of sub-Hall sensors may be positioned adjacent to the seventh connection point CT41. For example, the fifth sub-Hall sensor HS5 may be positioned adjacent to the seventh connection point CT41. Accordingly, a distance between the fifth sub-Hall sensor HS5 and the seventh connection point CT41 may be smaller than a distance between the other sub-Hall sensors (the sixth sub-Hall sensor to the eighth sub-Hall sensor) and the seventh connection point CT41.

In addition, the second Hall sensor 1253*b* may have a distance spaced apart from the fourth sub-coil SC2*b* in the optical axis direction that is smaller than a distance spaced apart from the fourth sub-coil SC2*b* in the first direction. That is, due to the arrangement of the second Hall sensor 1253*b* in the fourth sub-coil SC2*b*, a connection point for electrical connection may be formed on an upper or lower portion of the second Hall sensor 1253*b*. That is, the length of the second camera actuator in the optical axis direction is formed compactly according to the stroke, and a space in which the sub-coil and the board are electrically connected can be easily secured.

In an embodiment, at least one of the plurality of sub-Hall sensors may be disposed adjacent to the seventh connection point CT41 and may overlap the seventh connection point CT41 in the first direction (the X-axis direction). In this case, at least one of the plurality of sub-Hall sensors may be disposed to be tilted unlike the other Hall sensors. As described above, the fifth sub-Hall sensor HS5 may overlap the seventh connection point CT41 in the first direction, and a long side of the fifth sub-Hall sensor HS5 may be not parallel or not parallel to long sides of the sixth to eighth sub-Hall sensors HS6 to HS8.

With this configuration, it is possible to prevent a processing problem or an external exposure problem of an electromagnetic force, which occurs when the seventh terminal TM41 and the second terminal TM22 extend to the outside of the fourth sub-coil or the outer surface of the first board through the groove or hole of the second board 1272. Furthermore, since the seventh terminal TM41 and the seventh connection point CT41 are easily connected, it is possible to improve the reliability of the Hall sensor.

In addition, further referring to FIG. 17, the first Hall sensor 1253*a* and the second Hall sensor 1253*b* may be disposed to be misaligned in the second direction (the Y-axis direction).

The first sub-Hall sensor HS1, the second sub-Hall sensor HS2, the third sub-Hall sensor HS3, and the fourth sub-Hall sensor HS4 may not overlap the fifth sub-Hall sensor HS5, the sixth sub-Hall sensor HS6, the seventh sub-Hall sensor HS7, and the eighth sub-Hall sensor HS8 in the second direction (the Y-axis direction). Furthermore, the first sub-Hall sensor HS1, the second sub-Hall sensor HS2, the third sub-Hall sensor HS3, and the fourth sub-Hall sensor HS4 may have separation distances from adjacent sub-Hall sensors that differ from separation distances between adjacent sub-Hall sensors among the fifth sub-Hall sensor HS5, the sixth sub-Hall sensor HS6, the seventh sub-Hall sensor HS7, and the eighth sub-Hall sensor HS8. For example, the first sub-Hall sensor HS1, the second sub-Hall sensor HS2, the third sub-Hall sensor HS3, and the fourth sub-Hall sensor HS4 may have separation distances from adjacent sub-Hall sensors that are smaller than separation distances between adjacent sub-Hall sensors among the fifth sub-Hall sensor HS5, the sixth sub-Hall sensor HS6, the seventh sub-Hall sensor HS7, and the eighth sub-Hall sensor HS8. Accordingly, the above-described maximum movement distance (stroke) may be implemented in each lens assembly.

FIG. 18 is a view for describing parts of a 2-1 housing, a first lens assembly, a second lens assembly, and a driving part in a second camera actuator according to another embodiment, FIG. 19 is a view for describing parts of a 2-1 housing, a first lens assembly, a second lens assembly, and a driving part in the second camera actuator according to still another embodiment, and FIG. 20 is a side view illustrating a part of the driving part in FIG. 19.

Referring to FIGS. 18 and 19, the above-described contents except for contents to be described below can be applied to the second camera actuator according to each embodiment.

The first Hall sensor 1253*a* and the second Hall sensor 1253*b* may be disposed on at least one of the first sub-coil and the second sub-coil.

In the second camera actuator according to another embodiment, the first Hall sensor 1253*a* may be disposed in the second sub-coil SC2*a*, and the second Hall sensor 1253*b* may be disposed in the third sub-coil SC1*b*.

In addition, in the second camera actuator according to still another embodiment, the first Hall sensor 1253*a* and the second Hall sensor 1253*b* may partially overlap each other in the second direction.

For example, the first Hall sensor 1253*a* may be disposed in the first sub-coil SC1*a*, and the second Hall sensor 1253*b* may be disposed in the third sub-coil SC1*b*. Alternatively, the first Hall sensor 1253*a* may be disposed in the second sub-coil SC2*a*, and the second Hall sensor 1253*b* may be disposed in the fourth sub-coil SC2*b*.

Referring further to FIG. 20, as described above, the first Hall sensor 1253*a* may be disposed in the first sub-coil SC1*a*, and the second Hall sensor 1253*b* may be disposed in the third sub-coil SC1*b*. In addition, the first Hall sensor 1253*a* may partially overlap the second Hall sensor 1232*b* in the second direction. Furthermore, a part of the second Hall sensor 1253*b* may overlap the first sub-coil SC1*a* in the second direction.

In this way, the first Hall sensor 1253*a* and the second Hall sensor 1253*b* may be disposed in each of the sub-coils of the first coil and the second coil. Furthermore, one of the plurality of sub-Hall sensors may be disposed differently from the other sub-Hall sensors for connection between the board and the sub-coil.

FIG. 21 is a schematic diagram illustrating a circuit board according to an embodiment.

Referring to FIG. 21, as described above, the circuit board 1300 according to the embodiment may include a first circuit board part 1310 and a second circuit board part 1320. The first circuit board part 1310 may be positioned under the base and coupled to the base. In addition, the image sensor IS may be disposed on the first circuit board part 1310. In addition, the first circuit board part 1310 and the image sensor IS may be electrically connected. That is, the base may be positioned at the rear end of the second camera actuator, and the image sensor and the circuit board (the first circuit board part) may be positioned at the rear end of the base. The base may include a filter (e.g., infrared rays). The circuit board 1300 may include the above-described image sensor and a sensor base.

In addition, the second circuit board part 1320 may be positioned on a side portion of the base. In particular, the second circuit board part 1320 may be positioned on a first side portion of the base. Therefore, the second circuit board part 1320 may be positioned adjacent to the first coil positioned adjacent to the first side portion for easy electrical connection. In addition, the second circuit board unit 1320 may be positioned on the second side portion of the base. As described above, a plurality of second circuit board parts 1320 may be formed. However, the present invention is not limited thereto, and the second circuit board unit 1320 may be disposed on only any one of the first side portion and the second side portion.

Furthermore, the circuit board 1300 may further include a fixed board (not illustrated) positioned on a side surface thereof. Therefore, even when the circuit board 1300 is made of a flexible material, the circuit board 1300 may be coupled to the base while maintaining stiffness by the fixed board.

The second circuit board part 1320 of the circuit board 1300 may be positioned on the side portion of the driving part 1250. The circuit board 1300 may be electrically connected to the first driving part and the driving part. For example, electrical connection may be made by a surface mounting technology (SMT). However, the present invention is not limited to such a method.

The circuit board 1300 may include a circuit board having wiring patterns that may be electrically connected, such as a rigid printed circuit board (PCB), a flexible PCB, or a rigid-flexible PCB. However, the present invention is not limited to these types.

In addition, the circuit board 1300 may be electrically connected to another camera module in the terminal or a processor of the terminal. Therefore, the above-described camera actuator and camera module including the same may transmit and receive any signal in the terminal.

FIG. 22 is a perspective view of a mobile terminal to which the camera module according to the embodiment is applied.

As illustrated in FIG. 22, a mobile terminal 1500 according to the embodiment may include a camera module 1000, a flash module 1530, and an AF device 1510, which are provided on a rear surface thereof.

The camera module 1000 may include an image capturing function and an AF function. For example, the camera module 1000 may include the AF function using an image.

The camera module 1000 processes an image frame of a still image or a moving image obtained by an image sensor in a capturing mode or a video call mode.

The processed image frame may be displayed on a predetermined display and stored in a memory. A camera (not illustrated) may also be disposed on a front surface of a body of the mobile terminal.

For example, the camera module 1000 may include a first camera module 1000A and a second camera module 1000B, and the first camera module 1000A may implement an OIS function together with an AF or zooming function.

The flash module 1530 may include a light emitting device for emitting light therein. The flash module 1530 may be operated by a camera operation of the mobile terminal or a user's control.

The AF device 1510 may include one of a package of a surface light emitting laser device as a light emitting unit.

The AF device 1510 may include the AF function using a laser. The AF device 1510 may be mainly used in a condition that the AF function using the image of the camera module 1000 is degraded, for example, a proximity of 10 m or less or dark environment.

The AF device 1510 may include a light emitting unit including a vertical cavity surface emitting laser (VCSEL) semiconductor device and a light receiving unit for converting light energy into electrical energy, such as a photodiode.

FIG. 23 is a perspective view of a vehicle to which the camera module according to the embodiment is applied.

For example, FIG. 23 is an external view of the vehicle including a vehicle driving assistance device to which the camera module 1000 according to the embodiment is applied.

Referring to FIG. 23, a vehicle 700 according to the embodiment may include wheels 13FL and 13FR rotated by a power source and a predetermined sensor. Although the sensor may be a camera sensor 2000, the present invention is not limited thereto.

The camera sensor 2000 may be a camera sensor to which the camera module 1000 according to the embodiment is applied. The vehicle 700 according to the embodiment may acquire image information through the camera sensor 2000 for capturing a forward image or a surrounding image, determine a situation in which a lane line is not identified using the image information, and generate a virtual lane line when the lane line is not identified.

For example, the camera sensor 2000 may acquire a forward image by capturing a view in front of the vehicle 700, and a processor (not illustrated) may acquire image information by analyzing an object included in the front image.

For example, when a lane line, an adjacent vehicle, a traveling obstacle, and objects, such as a median, a curb, or a tree corresponding to an indirect road mark, are captured in the image captured by the camera sensor 2000, the processor may detect the object and include the detected object in the image information. At this time, the processor may further supplement the image information by acquiring distance information to the object detected through the camera sensor 2000.

The image information may be information on the object captured in the image. The camera sensor 2000 may include an image sensor and an image processing module.

The camera sensor 2000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

In this case, although the camera sensor 2000 may include a stereo camera for improving the measurement accuracy of the object and further securing information such as a distance between the vehicle 700 and the object, the present invention is not limited thereto.

Although embodiments have been mainly described above, these are only illustrative and do not limit the present invention, and those skilled in the art to which the present invention pertains can know that various modifications and applications that are not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

The invention claimed is:

1. A camera actuator comprising:

a housing;

a first lens assembly and a second lens assembly that move in an optical axis direction in the housing; and a driving part that moves the first lens assembly and the second lens assembly, wherein the driving part includes a first coil including a first sub-coil and a second sub-coil that are sequentially disposed in the optical axis direction, and a first Hall sensor including a plurality of sub-Hall sensors disposed in one of the first sub-coil and the second sub-coil, and a long side of at least one of the plurality of sub-Hall sensors is disposed to be misaligned with those of other Hall sensors.

2. The camera actuator of claim 1, wherein the first Hall sensor is disposed inside at least one of the first sub-coil and the second sub-coil.

3. The camera actuator of claim 2, wherein the first Hall sensor has a separation distance from the first sub-coil in the optical axis direction that is smaller than a separation distance from the coil in a direction perpendicular to the optical axis direction.

4. The camera actuator of claim 1, wherein the first sub-coil includes a first terminal extending an inside of a hole of the first sub-coil and a second terminal extending to an outside of the first sub-coil.

5. The camera actuator of claim 4, further comprising a board part disposed outside the driving part, wherein the first coil is disposed on the board part, and the board part includes a first connection point in contact with the first terminal and a second connection point in contact with the second terminal.

6. The camera actuator of claim 5, wherein at least one of the plurality of sub-Hall sensors is adjacent to the first connection point.

7. The camera actuator of claim 5, wherein at least one of the plurality of sub-Hall sensors overlaps the first connection point in a direction perpendicular to the optical axis direction.

8. The camera actuator of claim 7, wherein other Hall sensors among the plurality of sub-Hall sensors are disposed to be misaligned with the first connection point in the direction perpendicular to the optical axis direction.

9. The camera actuator of claim 5, wherein the plurality of sub-Hall sensors include a first sub-Hall sensor, a second sub-Hall sensor, a third sub-Hall sensor, and a fourth sub-Hall sensor that are sequentially disposed in the optical axis direction.

10. The camera actuator of claim 9, wherein the first connection point overlaps the first sub-Hall sensor in a direction perpendicular to the optical axis direction.

11. The camera actuator of claim 9, wherein the first connection point is disposed between the first sub-Hall sensor and the second sub-Hall sensor.

12. The camera actuator of claim 9, wherein a long side of the first sub-Hall sensor is not parallel to long sides of the second sub-Hall sensor, the third sub-Hall sensor, and the fourth sub-Hall sensor.

13. The camera actuator of claim 9, wherein the first connection point overlaps the second sub-Hall sensor in a direction perpendicular to the optical axis direction.

14. The camera actuator of claim 9, wherein the first sub-Hall sensor, the second sub-Hall, the third sub-Hall, and the fourth sub-Hall sensor have the same separation distance between adjacent sub-Hall sensors and centers of the first to fourth sub-Hall sensors.

15. The camera actuator of claim 5, wherein the first coil is connected to an inner surface of the board part, and the plurality of sub-Hall sensors are disposed on the inner surface of the board part.

* * * * *